US010093891B2

United States Patent
Kohl et al.

(10) Patent No.: US 10,093,891 B2
(45) Date of Patent: Oct. 9, 2018

(54) SUSPENDED SOLIDS SEPARATION

(71) Applicant: ICM, Inc., Colwich, KS (US)

(72) Inventors: Scott D Kohl, Wichita, KS (US);
Charles C Gallop, Gower, MO (US);
Kurt A Dieker, Wichita, KS (US)

(73) Assignee: ICM, Inc., Colwich, KS (US)

( * ) Notice: Subject to any disclaimer, the term of this patent is extended or adjusted under 35 U.S.C. 154(b) by 398 days.

(21) Appl. No.: 14/620,111

(22) Filed: Feb. 11, 2015

(65) Prior Publication Data

US 2015/0152372 A1    Jun. 4, 2015

Related U.S. Application Data

(63) Continuation of application No. 13/531,036, filed on Jun. 22, 2012, now Pat. No. 8,986,551, and a
(Continued)

(51) Int. Cl.
*A23K 10/37*    (2016.01)
*A23K 10/38*    (2016.01)
(Continued)

(52) U.S. Cl.
CPC ............... *C12F 3/10* (2013.01); *A23K 10/37* (2016.05); *A23K 10/38* (2016.05); *A23K 50/10* (2016.05);
(Continued)

(58) Field of Classification Search
CPC .......... C12F 3/10; C10L 1/1802; C10L 1/026; B01D 17/0217; B01D 1/00; C11B 13/00;
(Continued)

(56) References Cited

U.S. PATENT DOCUMENTS 6,203,825 B1 *  3/2001  Hodgkins ............ A23K 20/147
                                              426/2
8,071,122 B2 * 12/2011  Yamka ................ A23K 20/142
                                              424/439
(Continued)

OTHER PUBLICATIONS

Publication: "What is TDN? Homestead on the Range", https://homesteadontherange.com/2015/03/10/what-is-tdn/, author unknown, published Mar. 10, 2015.*

(Continued)

*Primary Examiner* — Joseph W Drodge
(74) *Attorney, Agent, or Firm* — Shirley Lee Anderson

(57) ABSTRACT

A method that includes clarifying a thin stillage product in a mechanical processor to produce a fine suspended solids stream and a clarified thin stillage is provided. The method further includes providing the thin stillage product and the clarified thin stillage, separately or in a combined stream, to one or more evaporators to produce one or more reduced suspended solids streams, each stream having a reduced amount of suspended solids and a lower viscosity as compared to process streams having a comparable total solids content but containing a higher amount of suspended solids. The method can further included further processing of one or more of the reduced suspended solids streams to produce a bio-oil product.

11 Claims, 8 Drawing Sheets

Related U.S. Application Data continuation of application No. 13/292,266, filed on Nov. 9, 2011.

(60) Provisional application No. 61/501,030, filed on Jun. 24, 2011.

(51) Int. Cl.
*A23K 50/10* (2016.01)
*C12F 3/10* (2006.01)
*C11B 13/00* (2006.01)
*B01D 1/00* (2006.01)
*B01D 17/02* (2006.01)
*C10L 1/18* (2006.01)
*C11B 3/08* (2006.01)
*C11B 3/16* (2006.01)
*C10L 1/02* (2006.01)

(52) U.S. Cl.
CPC ........... *B01D 1/00* (2013.01); *B01D 17/0217* (2013.01); *C10L 1/026* (2013.01); *C10L 1/1802* (2013.01); *C11B 3/08* (2013.01); *C11B 3/16* (2013.01); *C11B 13/00* (2013.01); *C10G 2300/1014* (2013.01); *C10G 2300/1018* (2013.01); *C10G 2300/44* (2013.01); *Y02E 50/10* (2013.01); *Y02E 50/30* (2013.01); *Y02P 30/20* (2015.11)

(58) Field of Classification Search
CPC ... C11B 3/08; C11B 3/16; Y02E 50/10; Y02E 50/30; Y02P 30/20; C10G 2300/44; C10G 2300/1018; C10G 2300/1014; A23K 10/00; A23K 10/12; A23K 10/23; A23K 10/30; A23K 10/37; A23K 10/38; A23K 50/10; A23K 50/15
USPC ............. 44/307, 308, 605, 606; 127/29–33; 426/49, 531, 590, 592, 615, 618, 623, 426/624, 635, 636, 656, 658; 435/161, 435/163; 536/56, 57, 102, 123.1, 123.2, 536/124, 127, 128; 554/8, 175, 177
See application file for complete search history.

(56) References Cited

U.S. PATENT DOCUMENTS

| | | | | |
|---|---|---|---|---|
| 2003/0232109 A1* | 12/2003 | Dawley | .................. | C08B 30/10 426/53 |
| 2006/0040024 A1* | 2/2006 | Srinivasan | ................ | B02B 1/02 426/482 |
| 2006/0057251 A1* | 3/2006 | Dawley | .................. | C08B 30/10 426/53 |
| 2006/0057257 A1* | 3/2006 | Ma | ..................... | B65D 41/3428 426/115 |
| 2006/0216396 A1* | 9/2006 | Abbas | .................... | A23K 10/37 426/635 |
| 2009/0071066 A1* | 3/2009 | Meier | ....................... | C10L 5/44 44/589 |
| 2010/0092603 A1* | 4/2010 | Bruinsma | ............... | C10L 1/026 426/2 |
| 2010/0159113 A1* | 6/2010 | Hayek | ...................... | A23K 1/14 426/623 |
| 2011/0212219 A1* | 9/2011 | Saito | ..................... | A23K 10/37 426/2 |

OTHER PUBLICATIONS

Publication: "Effects of Varying Dietary Levels of Total Digestible Nutrients, Protein and Fiber on the Growth of Crossbred Holstein Heifers fed Urea-Treated Rice Straw Diets Under Two Feeding Systems", S. Promma et al, Published in the AJAS Journal , 1993, vol. 6, Issue No. 1, pp. 91-97.*

Publication by Mertens et al, Gravimetric determination of amylase-treated neutral detergent fiber in fees with refluxing in beakers or crucibles: Collaborative Study. AOAC vol. 85, pp. 1217-1240, published 2002.*

Publication by Mary Beth Hall, "Neutral Detergent-Soluble Carbohydrates Nutritional Relevance and Analysis", A Laboratory Manual , University of Florida Extension Institute of Food and Agricultural Sciences, Bulletin 339, published Feb. 2000.*

* cited by examiner

Illustration of process described in U.S. 8,192,627

SUSPENDED SOLIDS SEPARATION

CROSS REFERENCE TO RELATED APPLICATION

This application is a continuation of U.S. patent application Ser. No. 13/531,036, filed Jun. 22, 2012, which claims benefit under 35 U.S.C. 119(e) of U.S. Provisional Application Ser. No. 61/501,030, filed Jun. 24, 2011, which are hereby incorporated herein by reference in their entireties. This application is also a continuation of PCT/US2012/043604 filed Jun. 21, 2012, continuation of U.S. patent application Ser. No. 13/292,266, entitled "BIO-OIL RECOVERY SYSTEMS," filed on Nov. 9, 2011, which application is a divisional of U.S. patent application Ser. No. 13/105,789, filed on May 11, 2011, entitled "BIO-OIL RECOVERY METHODS," now issued as U.S. Pat. No. 8,192,627 (hereinafter "627 patent"), which application claims benefit under 35 U.S.C. 119 (e) of U.S. Provisional Application Ser. No. 61/371,568 filed on Aug. 6, 2010, U.S. Provisional Application Ser. No. 61/420,674 filed on Dec. 7, 2010, and U.S. Provisional Application Ser. No. 61/472,549, filed on Apr. 6, 2011, all of which are hereby incorporated by reference herein in their entireties.

BACKGROUND

The methods for producing various types of alcohol from grain generally follow similar procedures, depending on whether the grain milling process is operated wet or dry. One alcohol of great interest today is ethanol, which can be produced from virtually any type of grain, but is most often made from corn. Ethanol can also be made from various cellulosic sources. Ethanol production generates co-products which can be used as is or which can be further processed.

SUMMARY

There is a need for improving production processes for various bio-products, such as alcohol production co-products. By removing suspended solids in a thin stillage stream as described herein, not only are the total solids reduced in downstream process streams, the viscosity of these streams is also reduced, allowing for more efficient dewatering. Additionally and surprisingly, with the suspended solids removed, soluble solids are now easier to concentrate. As a result, water can be removed in a more efficient manner, thus reducing operating costs, such as natural gas costs for dryers.

The various embodiments described herein not only allow various reduced suspended solids streams, such as a molasses product, to be produced, but also provide for enhanced recovery of bio-oil from alcohol production co-products. A solids product with enhanced amounts of fermentation aids can also be produced.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. The features illustrated in the figures are not necessarily drawn to scale, and features of one embodiment may be employed with other embodiments as the skilled artisan would recognize, even if not explicitly stated herein. Some embodiments are illustrated by way of example and not limitation in the figures of the accompanying drawings in which.

DETAILED DESCRIPTION

Figure 1A:
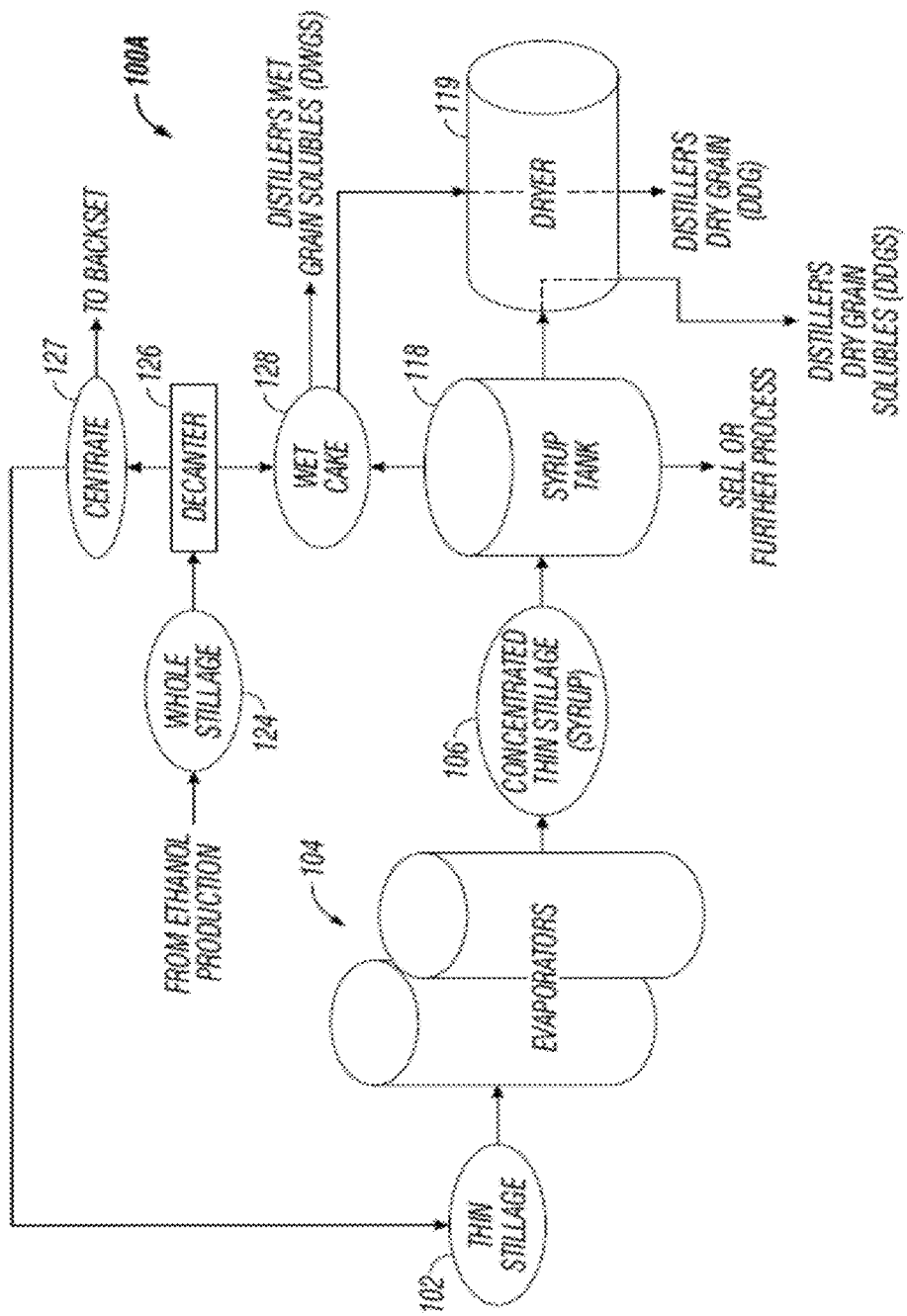
FIG. 1A is a schematic illustration of a conventional stillage processing system.

In the following detailed description, embodiments are described in sufficient detail to enable those skilled in the art to practice them, and it is to be understood that other embodiments may be utilized and that chemical and procedural changes may be made without departing from the spirit and scope of the present subject matter. The following detailed description is, therefore, not to be taken in a limiting sense, and the scope of embodiments of the present invention is defined only by the appended claims.

The various embodiments provide suspended solids separation systems and methods related thereto. Although the systems and methods described herein focus primarily on separating suspended solids from thin stillage resulting from ethanol production, any of the systems and methods described herein can be used to separate suspended solids from other types of bio-product process streams, including, for example, various other alcohol streams, such as butanol (e.g., isobutanol), biochemical streams, and the like.

The term "biomass" as used herein, refers generally to organic matter harvested (in particular seeds such as corn kernels or wheat kernels) or collected from a renewable biological resource as a source of energy. The renewable biological resource can include plant materials (e.g., plant biomass), animal materials, and/or materials produced biologically. The term "biomass" is not considered to include non-renewable fossil fuels, such as coal, petroleum and natural gas. These types of fossil fuels are formed by natural processes (such as anaerobic decomposition of long dead, buried organisms) and contain hydrocarbons such as alkanes, cycloalkanes, and various aromatic hydrocarbons, but do not normally include glycerides (e.g., tri-, di-, mono-).

The terms "plant biomass" or "ligno-cellulosic biomass" as used herein, are intended to refer to virtually any plant-derived organic matter (woody or non-woody) available to produce energy on a sustainable basis. Plant biomass can include, but is not limited to, agricultural crop wastes and residues such as corn stover, wheat straw, rice straw, sugar cane, bagasse, and the like. Plant biomass can further include byproducts of plant biomass, such as molasses. Plant biomass further includes, but is not limited to, woody energy crops, wood wastes and residues such as trees, which can include fruit trees, such as fruit-bearing trees, (e.g., apple trees, orange trees, and the like), softwood forest thinnings, barky wastes, sawdust, paper and pulp industry waste streams, wood fiber, and the like. The skins and/or rinds of the various fruits can also be used as plant biomass. Holo-cellulosic materials (hemicellulose and cellulose polymers) found in grain seeds, particularly those concentrated in the pericarp or hull of the seed, but often found in lower concentrations throughout the seed can also be used as plant biomass.

Additionally grass crops, such as various prairie grasses, including prairie cord grass, switchgrass, big bluestem, little bluestem, side oats grama, energy sorghum and the like, have the potential to be produced large-scale as additional plant biomass sources. For urban areas, potential plant biomass includes yard waste (e.g., grass clippings, leaves, tree clippings, brush, etc.) and vegetable processing waste. Plant biomass is known to be the most prevalent form of carbohydrate available in nature.

The term "low water extractable non-starch polysaccharide-containing plant biomass" or "low NSP plant biomass," as used herein, refers to plant biomass containing less than about 0.5%, by weight, down to 0% NSP. Corn, in particular the corn kernel, is one example of a low NSP plant biomass.

The term "biofuel" as used herein, refers to any renewable solid, liquid or gaseous fuel produced biologically, such as bio-oils, including for example, bio-oils derived from biomass. Most biofuels are originally derived from biological processes such as the photosynthesis process and can therefore be considered a solar or chemical energy source. Biofuels can be derived from biomass synthesized during photosynthesis, such as with agricultural biofuels (defined below). Other biofuels include algaculture biofuels (from algae), municipal waste biofuels (residential and light commercial garbage or refuse, with most of the recyclable materials such as glass and metal removed) and forestry biofuels (e.g., trees, waste or byproduct streams from wood products, wood fiber, pulp and paper industries). Biofuels also include, but are not limited to, biodiesels, bioethanol (i.e., ethanol), biogasoline, biomethanol, biobutanol, biogas, and the like.

The term "bio-oil" as used herein, refers to food-grade and non-food grade oils and fats that are derived from plants and/or animals (e.g., vegetable oils and animal fats, which contain primarily triglycerides, but can also contain fatty acids, diglycerides, and monoglycerides. (As used herein, the term "fat" is understood to include "lipids"). Examples of bio-oils derived from plants include, but are not limited to, corn oil, flaxseed oil, canola oil, and the like. See also the listing of biofuel sources noted in the definition for "agricultural biofuel" below, which are also useful as sources for bio-oil.

The term "agricultural biofuel" as used herein refers to a biofuel derived from agricultural crop (e.g., grains, such as corn and soybeans) plant biomass, crop residues, grain processing facility wastes (e.g., wheat/oat hulls, corn/bean fines, out-of-specification agricultural or biomass materials, etc.), livestock production facility waste (e.g., manure, carcasses, etc.), livestock processing facility waste (e.g., undesirable parts, cleansing streams, contaminated materials, etc.), food processing facility waste (e.g., separated waste streams such as grease, fat, stems, shells, intermediate process residue, rinsing/cleansing streams, etc.), value-added agricultural facility co-products (e.g., distiller's grain of any moisture content and/or syrup from ethanol production facilities, etc.), and the like. Examples of livestock include, but are not limited to, cattle, hogs, turkey, fish or chicken. Examples of agricultural crops include, but are not limited to, any type of non-woody plant (e.g., cotton), grains, including any type of cereal grains such as corn, wheat, soybeans, sorghum, barley, oats, rye, milo, rape seeds, canola, sunflower, pennycress, and the like, herbs (e.g., peanuts), herbaceous crops such as switchgrass, alfalfa, other starch containing crops such as bagasse, sugarcane, and other bio-oil-bearing starch or sugar based materials, and so forth. Ethanol and biodiesel are examples of agricultural biofuels.

The term "stillage" as used herein refers to a co-product produced during production of a biofuel, and is sometimes referred to as "slop." When used without qualification, the term "stillage" can refer to whole stillage, thin stillage, or concentrated stillage (such as condensed distillers soluble, i.e., syrup, which can be produced from biofuel process streams, e.g., ethanol production process streams). Such streams contain soluble organic and inorganic compounds, suspended materials containing protein, carbohydrate, and bio-oil fractions and may have a free bio-oil component and an emulsified bio-oil component, or all of the bio-oil may be emulsified.

The term "free oil" or "free bio-oil" as used herein, refers to a bio-oil that is not emulsified, physically or chemically bound or trapped by components in the process stream and can be phase separated from the process stream, i.e., recovered from the process stream via mechanical processing and/or non-mechanical processing as defined herein.

The terms "emulsion" or "emulsified layer" as used herein refer to a mixture of two or more immiscible (unblendable) liquids, i.e., liquids that are sparingly soluble within each other. Emulsions are part of a more general class of two-phase systems of matter called colloids. Although the terms colloid and emulsion are sometimes used interchangeably, emulsion tends to imply that both the dispersed and the continuous phase are liquid. In an emulsion, one liquid (the dispersed phase) is dispersed in the other (the continuous phase) (Wikipedia http://en.wikipedia.org/wiki/Emulsion). Whether an emulsion becomes a water-in-oil emulsion or an oil-in-water emulsion depends on the volume fraction of both phases and on the type of emulsifier.

Generally, the Bancroft rule applies, which suggests that emulsifiers and emulsifying particles tend to promote dispersion of the phase into which they are not well dissolved; for example, proteins dissolve better in water than in oil. As a result, proteins tend to form oil-in-water emulsions, i.e., proteins promote the dispersion of oil droplets throughout a continuous phase of water.

An emulsion can contain entrapped components, such as bio-oil, as well as other components, including, but not limited to, starches, free fatty acids (FFA) (e.g., arachidic acid, stearic acid, palmitic acid, erucic acid, oleic acid, arachidonic acid, linoleic acid and/or linolenic acid), fatty acid lower(alkyl) esters, phospholipids, grain germ fractions, yeast, protein, fiber, glycerol, residual sugars, other organic compounds and/or other inorganic compounds such as anion and cation salts of organic acids (e.g., metallic salts such as sodium sulfate, sodium sulfite, magnesium sulfate and potassium phytate, magnesium phytate, magnesium phosphate, sodium carbonate, magnesium oxalate, calcium oxalate, caratenoids, and/or antioxidants).

The term "emulsion concentrate" as used herein refers to a stable emulsion (water-in-bio-oil or bio-oil-in-water) containing minor amounts of other components from a processing stream, such as from the processing streams described herein.

The term "mechanical processing" or "mechanical process" as used herein refers to interaction of a machine or device with any portion of a process stream sufficient to cause or alter motion of the process stream. Mechanical processing is accomplished with mechanical force and/or addition and/or reduction of kinetic energy.

The term "mechanical processor" or device as used herein refers to a machine or device (with or without moving parts) capable of carrying out mechanical processing and can further include a device capable of carrying out mechanical processing in combination with non-mechanical processing (such as the use of a centrifuge to add centripetal force to aid phase separation caused by gravity).

The term "non-mechanical processing" or "non-mechanical process" as used herein refers to a non-mechanical process that causes change in a process stream other than by imparting and/or altering motion of the processing stream. A non-mechanical process includes any type of chemical process such as gravity separation.

The term "non-mechanical processor" as used herein refers to a machine or device capable of carrying out non-mechanical processing on a process stream. One example of a non-mechanical processor is a gravity-settling tank.

The term "chemical processing" or "chemical process" as used herein refers to a process that changes the composition of the process stream in one or more steps with or without the use of added components and with or without added (or reduced) heat and/or added or reduced pressure. A chemical reaction is one type of chemical process. One example of such a reaction is the emulsion breaking reaction as described in the '627 patent. Other examples of a chemical process include catalysis, coagulation, and flocculation. A chemical process can also refer to a passive chemical process.

The term "passive chemical processing" or "passive chemical process" as used herein refers to a process that allows a chemical change to occur naturally in a process stream over time without adding additional components to the process stream and/or heating and/or pressurizing the process stream. Gravity separation of phases in a process stream is one example of a passive chemical process as it uses only the force of gravity to allow separation to occur.

The term "aqueous phase" as used herein refers to a process stream containing primarily water and solids,—and which can further contain glycerin, acetic acid, sulfuric acid, residual soluble sugars, soluble proteins, and trace minerals, such as Mg, Fe, and Ca. In the system described in the '789 application, the aqueous phase further includes an amount of emulsion breaking additive (as defined therein).

The term "bio-oil phase" as used herein refers to a process stream containing primarily bio-oil, and which can further contain an amount of emulsion breaking additive and other minor components.

The term "evaporation" as used herein refers to removal or vaporization of a solvent. Use of increased temperature and/or decreased pressure is one type of evaporation that is often referred to as "flashing" or "flash evaporation."

The term "total solids" as used herein refers to all components in a process stream other than water. When used without qualification, the term "solids" is intended to refer to total solids, by weight.

The term "dissolved solids" or "solubles" as used herein refers to solid particles that are mixed sufficiently with the fluid in a process steam such that they do not separate from the process stream during mechanical processing.

The term "fine suspended solids stream" as used herein refers to a process stream containing suspended solid particles, i.e., "insolubles," which can be separated from the process stream. The particles in the fine suspended solids stream are primarily less than about 20 micrometers in diameter, but can also include larger solid particles.

The term "thin stillage" as used herein refers to a conventional process stream produced as a co-product of alcohol production (e.g., ethanol production) which contains between about 3% and about 15%, by weight, of total solids, of which about 25% to 75% are suspended solid particles.

The term "concentrated thin stillage" or "syrup" as used herein refers to a conventional process stream produced as a co-product of alcohol production (e.g., ethanol production) which contains between more than about 20% up to about 45%, by weight, of solids, of which about 25% to 75% are suspended solid particles.

The term "clarified thin stillage" as used herein refers to a process stream containing between about 3% and about 15%, by weight, of total solids, of which less than 25% are suspended solid particles. A clarified thin stillage stream typically has a cloudy appearance.

The term "thin stillage product" as used herein refers to a process steam containing various ratios of thin stillage and clarified thin stillage. At start-up, the thin stillage product can comprise only thin stillage.

The term "clarified concentrated thin stillage" as used herein refers to a process stream containing between about 15% and 40%, by weight, of total solids, of which less than about 25% are suspended solid particles. A clarified concentrated thin stillage stream typically has a cloudy appearance.

The term "molasses product" as used herein refers to a process stream containing at least 45% by weight of total solids, of which less than 25% are suspended solid particles. As such, the "molasses product" described herein can be used as a substitute for conventional "molasses", which is a viscous by-product from the processing of sugar cane, grapes or sugar beets into sugar.

The term "reduced suspended solids stream" as used herein refers to a process stream having any total solids content between about 2% up to substantially or about 100%, by weight, but which has a reduced amount of suspended solids particles as compared to conventional process streams with comparable total solids content, and can further include a stream containing no suspended solid particles. Process streams comprised of clarified thin stillage, thin stillage product (after start-up), clarified concentrated thin stillage, and molasses products are examples of reduced suspended solids streams. Such process streams have a lower viscosity as compared to conventional process streams with comparable total solids content as these conventional streams contain more suspended solid particles.

Grain-based ethanol can be produced from a wet mill process, a dry grind ethanol process, or a "modified" dry grind ethanol process as is understood in the art. See, for example, Kohl, S., Ethanol 101: Overview of Ethanol Production, *Ethanol Today*, July 2003, pp. 36-37 for a detailed description of a typical dry grind ethanol process, which is hereby incorporated herein by reference in its entirety. See also patent '627 and the various Kohl references cited herein for additional details on dry grind and modified dry grind processes as on typical wet milling processes.

Regardless of the specific process used (wet mill, dry grind or modified dry grind), conventional ethanol production results in useful co-products which, after mechanical processing, or heating and mechanical processing, are designed to recover free bio-oil and/or bio-oil present in an unstable emulsion. (See also the '627 patent in which bio-oil is recovered from a stable emulsion).

Co-products produced as a result of distillation and dehydration include whole stillage, which is typically subject to a centrifugation or decanter step to separate insoluble solids ("wet cake") from the liquid (which is oftentimes referred to as "centrate" until it enters a stillage tank, if present, at which point it is sometimes referred to as "thin stillage"). In a dry grind ethanol process, stillage enters evaporators in order to boil away moisture, producing a concentrated syrup containing the soluble (dissolved) solids from the fermentation. See, for example, Kohl, S., Ethanol 101-9: Evaporation, *Ethanol Today*, May 2004, pp 36-39, which is herein incorporated by reference in its entirety.

This concentrated syrup can be mixed with the centrifuged wet cake, and the mixture sold to beef and dairy feedlots as Distillers Wet Grain with Solubles (DWGS). Alternatively, the wet cake and concentrated syrup mixture may be dried and sold as Distillers Dried Grain with Solubles (DDGS) to dairy and beef feedlots. See, for example, Kohl, S., *Ethanol* 101-10: *Drying-Production of DDGS*, Ethanol Today, June 2004, pp. 34-36, which is hereby incorporated herein by reference in its entirety.

Adding syrup to wet cake has limited economic value. Additionally, using syrup to produce DDGS is expensive, since the dryers utilize a large amount of energy to evaporate water from the syrup. Additionally, syrup can contain sulfur and salts, both of which can lower the quality, and thus the selling price, of the DDGS. With its lower protein content, syrup can also dilute the protein content of the DDGS. The appearance of the DDGS can also be affected by addition of syrup, giving it an undesirable brown color.

Selling syrup as a liquid feed supplement can be about 3 to 6 times less cost effective than selling DDGS. Syrup has a low value for a number of reasons, such as wide variability of composition, poor handling characteristics, high water content (greater than 60% by weight) and high viscosity (semi-solid) upon cooling such that it requires heating in order to be pumped.

Figure 5:
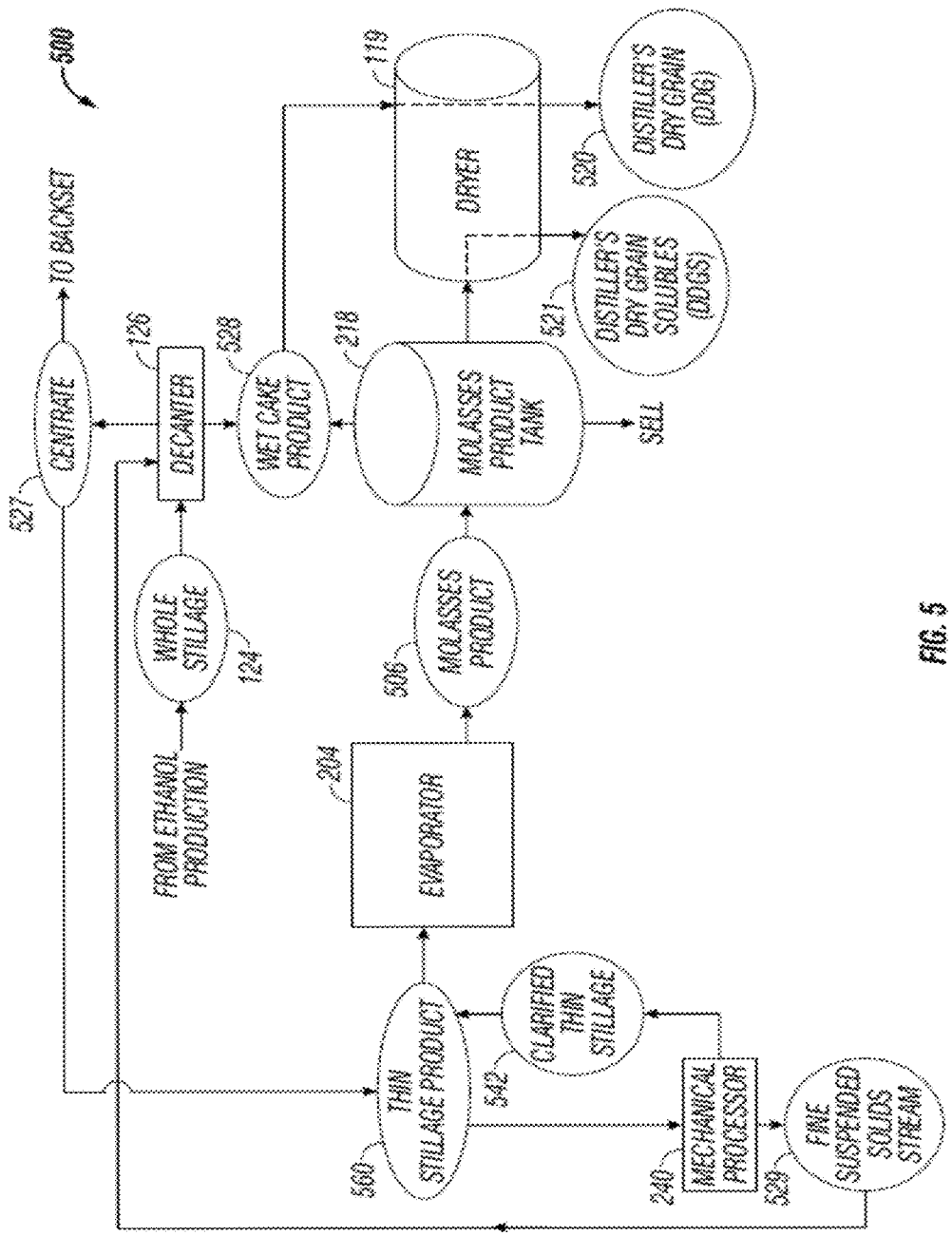
FIG. 5 is a schematic illustration of a suspended solids separation system without a bio-oil recovery system according to various embodiments.

In contrast, in the various embodiments described herein, at least a portion of a thin stillage product is provided to a mechanical processor to separate suspended solids (primarily fine suspended solids having a diameter less than about 20 micrometers) present in the process stream from the dissolved solids also present in the process stream to produce a fine suspended solids stream In some embodiments, the fine suspended solids stream can then be added to the wet cake product fraction, resulting in DDGS having increased value due to the presence of high value components, such as single cell proteins, e.g., yeast (See, for example, FIG. 5). As a result, the dryer load (e.g., 119) can be reduced, which not only reduces costs for the dryer operation, but can also allow the entire facility to run more efficiently. It is also likely that the DDGS provided is of higher quality due to use of lower dryer temperatures.

In the various embodiments described herein, a thin stillage product from an alcohol production facility is provided to a mechanical processor to separate it into a fine suspended solids stream and clarified thin stillage. Some or all of the clarified thin stillage is then returned to the thin stillage product. By clarifying at least a portion of the thin stillage and then providing the two products, either separately or in a combined stream, to one or more evaporators, it is now possible to produce a stream having a reduced suspended solids content, i.e., a reduced suspended solids stream. Examples of a reduced suspended solids stream include, for example, a molasses product having a total solids content no less than about 45% by weight, with a suspended solids content of less than 25% down to substantially or about 0%. In one embodiment, the fine suspended solids stream contains fermentation aids (e.g., single cell proteins such as yeast), which can be dried and sold. In one embodiment, use of the solids separation technology in combination with bio-oil recovery systems improves bio-oil yield.

Conventional attempts to remove suspended solids from process streams include operations that separate whole stillage to produce an insoluble solids portion containing non-single celled high protein grain products such as corn meal. In contrast to thin stillage, whole stillage is known to contain large fiber and protein particles with a substantial portion, i.e., at least 30 up to 80% of these particles greater than 20 micrometers in diameter.

Other attempts to separate stillage include various non-mechanical and/or chemical separation techniques. Such techniques are known to result in limited suspended solids recovery.

Other attempts to remove fine suspended particles have included electrostatic or ionic precipitation, which are known to achieve less than satisfactory results. Yet other attempts include pH adjustment to cause precipitation. However, costs of adjusting pH can be quite high. Additionally, higher pH products can become discolored, thus reducing their value. Additional problems with pH adjustment include the production of soap, and reduced palatability for animals consuming animal feed made from these products.

FIG. 1A shows a prior art system 100A for processing stillage from an ethanol production process. Stillage can be subjected to dewatering by a variety of means, such as by evaporation or pressing before or instead of providing to a drying zone. In FIG. 1, whole stillage 124 (from ethanol production) is provided to a decanter 126 where it is separated into wet cake 128 and centrate 127. A portion of the centrate 127 can be recycled as "backset" in the ethanol production facility and the remaining portion, although also having the identical content as centrate 127, is commonly referred to as "thin stillage" at this point in the process. The thin stillage 102 is then provided to evaporators 104 for concentration.

As shown in FIG. 1A, the resulting concentrated thin stillage (i.e., syrup) 106 exiting the evaporators 104 is provided to a syrup tank 118. The concentrated thin stillage 106 can be dried in a dryer 119 (often referred to as a "Distiller's Grain Dryer") to produce DDGS as discussed above and/or sold as is and/or further processed. Alternatively or additionally, a portion of the concentrated thin stillage 106 can be combined with the wet cake 128 and the mixture sold as DWGS and/or the mixture can be provided to the dryer 119 to produce DDGS. The wet cake 128 exiting the decanter 126 can alternatively be provided as is to the dryer 119.

Figure 1B:
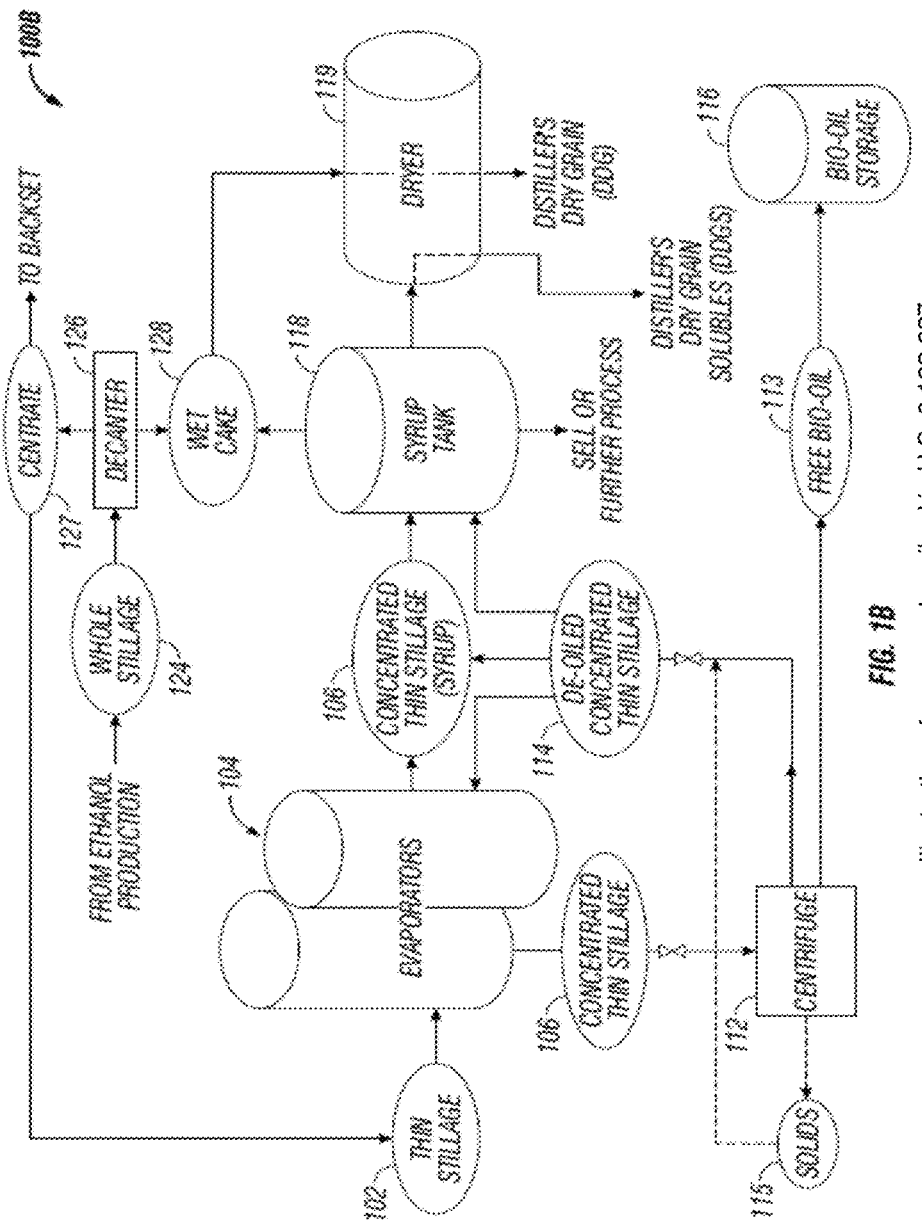
FIG. 1B is a schematic illustration of a bio-oil recovery system.

FIG. 1B shows a bio-oil recovery system 100B for processing stillage from an ethanol production process, as described in the '627 patent, which includes all of the steps as described in FIG. 1A, together with steps directed to producing free bio-oil. As shown in FIG. 1B, concentrated thin stillage 106 is provided to a centrifuge 112 for further separation into free bio-oil 113, de-oiled concentrated thin stillage 114, and solids 115. The free bio-oil 113 is provided to bio-oil storage 116. The de-oiled concentrated thin stillage 114 can then be returned to the evaporators 104 as shown, and/or can be provided to the process stream exiting the evaporators 104 which contains concentrated thin stillage (i.e., syrup) 106 and/or directly to the syrup tank 118.

In contrast, the novel embodiments described herein do not provide all of the thin stillage 102 directly to the evaporators 104 as shown in FIGS. 1A and 1B. Instead, a thin stillage product 260 containing a reduced amount of suspended solids is provided to an evaporator 204 as shown in the suspended solids separating system 200 in FIG. 2. The thin stillage product 260 (comprised at start-up of thin stillage 202 and, during operation, of thin stillage 202 in combination with clarified thin stillage 242) can be provided to a mechanical processor 240.

Figure 2:
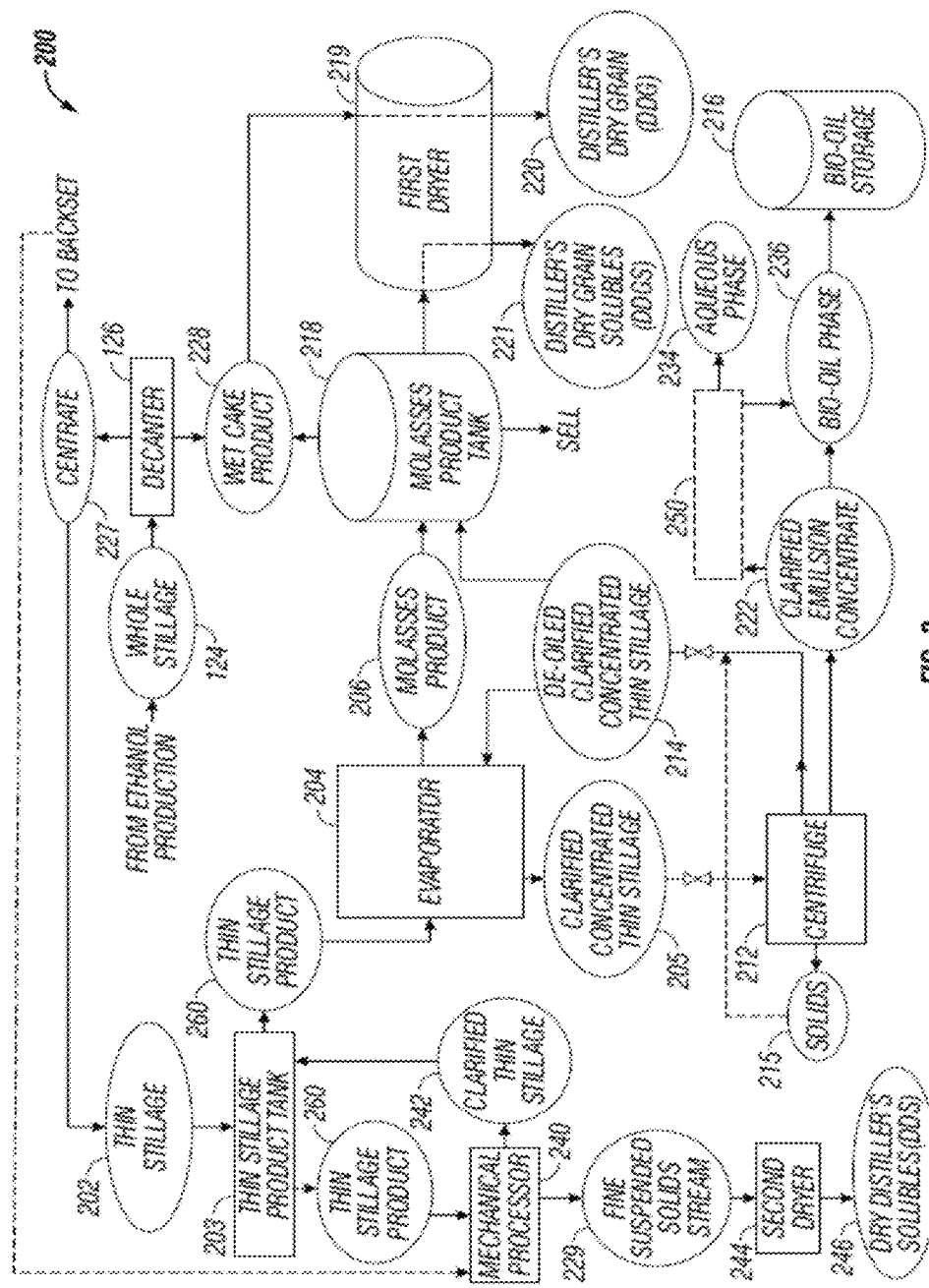
FIG. 2 is a schematic illustration of a suspended solids separation system in combination with a bio-oil recovery system capable of producing an emulsion concentrate according to various embodiments.

In the embodiment shown in FIG. 2, the thin stillage product 260 is optionally held in a thin stillage product tank 203 for a suitable period of time prior to being provided to the mechanical processor 240. Use of a holding tank such as the thin stillage product tank 203 in this manner can serve as a system control device by providing a quantity of thin stillage product 260 for use in this portion of the system, whether or not the processes upstream are operating or down for repair. The thin stillage product tank 203 can, optionally, utilize a heat source, such as steam from an in-house source, to increase the temperature of the thin stillage product 260 if desired. In other embodiments, there is no thin stillage product tank 203 and the thin stillage product 260 is provided directly to the mechanical processor 240. In one embodiment, only a portion of the thin stillage product 260 is provided to the mechanical processor 240, with the remainder provided directly to the evaporator 204.

In the embodiment shown in FIG. 2, the suspended solids separating system 200 includes a bio-oil recovery system 250 (as described in, for example, patent '627). In this embodiment, whole stillage 124 is derived from an ethanol production facility. In other embodiments, the whole stillage 124 can be derived from any type of alcohol production facility, such as an ethanol or butanol production facility. The system 200 shown in FIG. 2 includes separating whole stillage 124 in a decanter 126 to produce centrate 227 and a wet cake product 228, which, at start-up comprises conventional wet cake, and thereafter, can comprise a molasses product-containing wet cake, and, in some embodiments, can additionally or alternatively include fine suspended solids from a fine suspended solids stream (e.g., 529, FIG. 5).

In the embodiment shown in FIG. 2, the wet cake product 228 is provided to a first dryer 219 to produce DDG 220. A portion of the centrate 227 is provided as "backset," a portion or all of which can be provided to the mechanical processor 240 as shown in FIG. 2. The other portion of the centrate 227, although compositionally the same, is referred to in this point of the process as thin stillage 202.

In one embodiment (not shown), all of the centrate 227 is instead provided to the mechanical processor 240. In this embodiment, the clarified thin stillage 242 can be split into more than one stream, such that a portion of it becomes backset and a portion is provided to the evaporator 204.

As noted above, the thin stillage product 260 enters the mechanical processor 240 where it is separated into a fine suspended solids stream 229 and clarified thin stillage 242. The clarified thin stillage 242 (now depleted in protein and enriched in bio-oil and soluble as compared to the thin stillage product 260) can be returned to the thin stillage product tank 203. Thereafter, the thin stillage product 260 is provided to the evaporator 204 for dewatering.

At this point in the process, the thin stillage product 260 is comprised of a mixture of thin stillage 202 and clarified thin stillage 242, with the ratios of each varying throughout the operation. The thin stillage product 260 has a reduced suspended solids content as compared to the thin stillage 202. In one embodiment, a portion of the clarified thin stillage 242 is provided directly to the evaporator 204.

The fine suspended solids stream 229 can be processed in any suitable manner. In the embodiment shown in FIG. 2, the fine suspended solids stream 229 is provided to a second dryer 244 to produce Distillers Dried Solubles (DDS) 246. The second dryer 244 is, in one embodiment, any dryer capable of handling a highly viscous material (i.e., having a viscosity greater than about 5000 centipoise), such as a non-rotary dryer, (e.g., steam tube dryer, flash dryer, ring dryer, spray dryer, tunnel dryer and the like). In other embodiments, as shown in FIG. 5, for example, a portion or all of the fine suspended solids stream 229 can be provided to the decanter 126 to produce the wet cake product 228. In yet another embodiment, prior to entering the second dryer 244, the fine suspended solids stream 229 is subjected to a dewatering step to remove additional water prior to drying. The dewatering can include any suitable means, including, but not limited to, centrifuging (e.g., high-G compactor centrifuge, e.g., 370 in FIG. 3), filtering, decanting, and the like.

The DDS 246 contains an increased amount of single cell proteins, e.g., yeast, as well as a reduced amount of grain protein, fiber, and bio-oil. In one embodiment, the DDS 246 is a high protein, low fiber feed product (e.g., at least about 30% protein and no more than about 10% fiber, by weight). In one embodiment, single cell proteins are present in the fine suspended solids stream 229 at a level below 40%, by weight. In one embodiment single cell proteins are present at a level greater than 40%, by weight, such as up to greater than 70% or 90%, including any values there between.

Referring again to FIG. 2, the evaporator 204 can represent multiple effect evaporators, such as any number of evaporators, such as one, two, three or more, such as four, five, six, or seven evaporators, further including, for example, eight (8) evaporators. In some embodiments, more than eight evaporators may be used. In such embodiments, forward feeding can take place when the thin stillage product 260 enters the evaporator 204 through a first effect evaporator that is run at the highest temperature. The thin stillage product 260 is then partially concentrated, as some of the water has vaporized and can be used downstream. This clarified and partially concentrated product (not shown) are then fed into a second effect evaporator that is slightly lower in temperature than the first effect evaporator. The second effect evaporator uses the heated vapor created from the first stage as its source of heating. In one embodiment, the evaporator 204 comprises first effect and second effect evaporators that utilize recycled steam.

In one embodiment, the first effect evaporators use steam from a boiler (not shown) in the alcohol production facility (e.g., ethanol production facility) to generate process steam. This steam becomes cooled and can be re-used in a distillation step (not shown). In one embodiment, the second effect evaporators also use recycled steam. In one embodiment, direct steam from the boiler is used in the distillation step and the evaporator 204 comprises multiple evaporators which are run "post distillation."

In one embodiment, the evaporator is a multiple effect evaporator as described above, such as a three effect evaporator. In one embodiment, the evaporator is a four effect evaporator. In one embodiment, the evaporator is a five effect evaporator. In one embodiment, the evaporator is a Mechanical Vapor Recompression (MVR)-type energy cascade system.

In embodiments having eight (8) evaporators, the first evaporator can be run at temperatures as high as about 210° F. (99° C.), with the fourth evaporator run at temperatures between about 200° F. (93° C.) and about 205° F. (96° C.). In other embodiments with fewer evaporators or with one evaporator, the temperatures can vary between about 22° C. and about 121° C., such as between about 130° F. (54.4° C.) and about 210° F. (99° C.), including any ranges there between.

As the thin stillage product 260 progresses through the evaporator 204, it becomes increasingly concentrated to the point it eventually becomes a molasses product 206, which, in one embodiment, can have a water concentration between about 5% and about 55%.

It is possible to withdraw the reduced suspended solids product at any point or points during evaporation, depending on the desired final product or products. In one embodiment, a reduced suspended solids product, such as clarified concentrated thin stillage 205 having a water concentration of between about 65% and about 75% by weight, such as about 70%, is withdrawn from the evaporator 204 and provided to a centrifuge 212 to produce solids 215 and a clarified emulsion concentrate 222. The clarified emulsion concentrate 222 is provided to the bio-oil recovery system 250, which produces a bio-oil phase 236 and an aqueous phase 234. The bio-oil phase 236 is then provided to bio-oil storage 216 where it can be sold into various markets, such as the feed, chemical and/or biofuel oil markets at a higher selling price than conventional syrup or Distiller's Dry Grain Solubles (DDGS).

The resulting de-oiled reduced suspended solids product, i.e., the de-oiled clarified concentrated thin stillage 214, can be returned to the evaporator 204 where the evaporation process continues until the molasses product 206 is produced. In one embodiment, the molasses product 206 is a cooled molasses product, which is a solid product that is congealed. However, in order to move the molasses product 206 through the system 200, in most embodiments, the molasses product 206 is heated sufficiently to allow it to be pumped. In one embodiment, the molasses product 206 is heated to a temperature of at least about 100° F. (38° C.). In this way, although highly concentrated, the molasses product 216 is a pumpable liquid product due to the reduced amount of suspended solids.

In one embodiment, a reduced suspended solids stream, which is more concentrated than the thin stillage product 260, but less concentrated than the molasses product 206 can be withdrawn from the evaporator (not shown in FIG. 2). Such a product can have a total solids content between about 30% and 90%, by weight, with the suspended solids comprising less than about 25%, by weight, of the total solids content, is produced.

In one embodiment, the reduced suspended solids stream is the molasses product 206 having a total solids content greater than about 45%, by weight, such as greater than about 60% or 70% or 80% or 90% or 95% or higher up to substantially 100%, as long as the molasses product 206 is still pumpable at elevated temperatures, including any range there between.

In one embodiment, the suspended solids in the molasses product 206 comprise less than 25%, by weight of the total solids, such as about 20% or about 0% or lower, down to about 5% or lower, down to about 1% or lower, such as about 0.001%, by weight, down to substantially or about zero %, including any range there between. In one embodiment, the molasses product 206 has a total solids content between about 65% and 75%, by weight, such as about 70%, with a suspended solids content comprising less than 3.5%, by weight, of the total solids content.

It is possible to withdraw the clarified concentrated thin stillage 205 and/or the molasses product 206 from the evaporator 204 at temperatures lower than their boiling points. In one embodiment, the clarified concentrated thin stillage 205 and/or another reduced suspended solids stream (not shown) and/or the molasses product 206 is withdrawn at a temperature of about 205° F. (96.1° C.) or below. In embodiments having eight evaporators, the clarified concentrated thin stillage 205 and/or another reduced suspended solids stream (not shown) and/or molasses product 206 may be withdrawn from any of the evaporators, such as from the fourth, fifth, sixth, seventh, and/or eighth evaporators at temperatures of between about 170° F. (76.7° C.) and about 205° F. (96.1° C.). The decision as to which evaporator 204 the clarified concentrated thin stillage 205 and/or any other reduced suspended solids process stream (not shown) and/or molasses product 206 should be removed from depends on several factors, including, but not limited to, the volume % of unstable emulsion present, viscosity of the clarified concentrated thin stillage 205 and/or other reduced suspended solids process stream and/or molasses product 206, and the like, which can vary depending on upstream processing conditions.

Referring again to FIG. 2, the molasses product 206 exiting the evaporator 204 can be at any suitable pH. In one embodiment, the molasses product 206 is at a pH of between about 2 and about 5.8. In one embodiment, the pH may be closer to pH 7. In one embodiment, the pH may be higher, such as about 8.3.

By separating out the suspended solids in the fine suspended solids stream 229, the thin stillage product 260 entering the evaporator 204 now contains a reduced amount of suspended solids. As a result, it is now possible to efficiently and economically produce clarified concentrated thin stillage 205 and/or any other reduced suspended solids process stream, including a molasses product 206 as a co-product of alcohol production, e.g., ethanol production. These reduced suspended solids products, such as the molasses product 206 shown in FIG. 2, can then be provided to a molasses product tank 218 and sold and/or combined with the wet cake product 228 and dried in the first dryer 219 to produce DDGS 221. In one embodiment, the molasses product 206 is additionally or alternatively combined with the wet cake product 228 and—can optionally also be provided as DWGS.

The molasses product 206 further contains an amount of bio-oil that is greater than the amount, per volume, of bio-oil present in conventional concentrated thin stillage. In one embodiment, the molasses product 206 contains two to three times the amount of bio-oil, per volume, as compared to conventional concentrated thin stillage.

As a comparison and for example purposes only, a given volume of concentrated thin stillage having about 35% total solids, by weight, can contain about 4 to about 6% bio-oil, by volume, whereas the same volume of molasses product 206 can have about 70% total solids, by weight, and contain about 8 to about 12% bio-oil, by volume. As such, mechanical processing, such as centrifugation, can run more efficiently as compared with mechanical processing performed in conventional operations. In one embodiment, the number of centrifuges used in the system can be reduced, such as by one-half, such as from two to one.

In the embodiment shown in FIG. 2 the system further includes a bio-oil recovery system 250, such as is described in the '627 patent. In this embodiment, the operation of the centrifuge 212 is adjusted to dewater or concentrate the clarified concentrated thin stillage 205 to produce an emulsion concentrate, which, since there is a reduced amount of suspended solids contained therein, is referred to in FIG. 2 as a clarified emulsion concentrate 222. The clarified emulsion concentrate 222 is thereafter provided to an emulsion breaking/phase separating process 250, which produces an aqueous phase 234 and a bio-oil phase 236.

The mechanical processor 240 is capable of changing the nature of the solid particles, i.e., neutralizing the electrostatic charge of fine suspended solids from dissolved solids in the process stream, thus allowing the fine suspended solids to bind together. In this way, the fine suspended solids can be separated from the thin stillage product 260. The mechanical processor 240 can comprise any suitable device capable of separating the fine suspended solids mixture 229 as described.

Separation efficiency of the mechanical processor 240, i.e., the ability of the mechanical processor 240 to separate suspended solids from the process stream, is also a consideration. In one embodiment, the separation efficiency is at least 50%, up to about 60%, 70%, 80%, 90% or higher, including any ranges there between. In one embodiment, the separation efficiency is at least 80%. In one embodiment, the separation efficiency is between about 80% and about 90% or between about 85% and about 95%. In one embodiment, the separation efficiency is at least 96%, such as about 96.7%. Higher separation efficiencies may also be possible.

In one embodiment, the mechanical processor 240 is a centrifuge, such as a disc stack centrifuge. A disc stack centrifuge is a vertically-oriented centrifuge with the capability to separate fine suspended particles from solution more effectively than a standard centrifuge. The enhanced separation efficiency is due to the higher G-force produced by the disc stack unit as well as the large surface area provided by the discs inside the centrifuge. The discs are stacked closely together to provide additional surface area for more effective separation. As the centrifuge spins, centrifugal force sends the denser solids outward against the wall of the bowl, and the less dense liquid is forced to the center. The fine suspended solids stream 229 is discharged through a fixed port or by rapidly opening and closing space in the wall of the centrifuge, and the clarified thin stillage 242 is discharged through a pipe at the top (not shown). In one embodiment, any suitable filtration system comprising one or more filters, is additionally or alternatively used as a mechanical processor 240. In one embodiment, the system includes a bio-oil recovery system 250 and the mechanical processor 204 comprises a filtration system.

Figure 3:
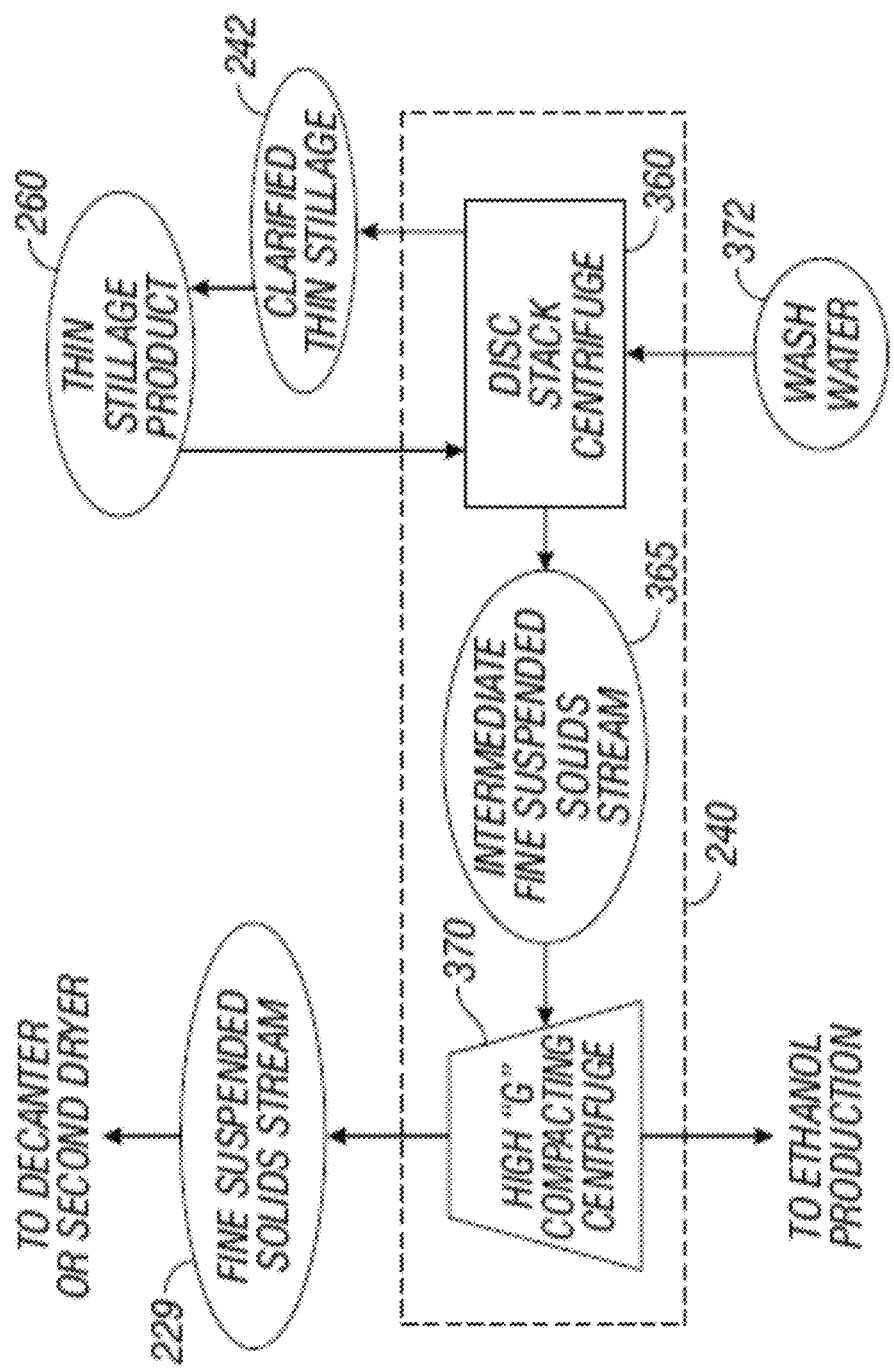
FIG. 3 is a schematic illustration of a mechanical processor for separating suspended solids according to various embodiments.

In one embodiment, as shown in FIG. 3, the mechanical processor 240 comprises both a disc stack centrifuge 360 and a high "G" compacting centrifuge 370. The high "G" compacting centrifuge 370 is capable of operating in excess of 3000 G forces. In the embodiment shown in FIG. 3, the thin stillage product 260 enters the disc stack centrifuge 360, which separates the thin stillage product 260 into clarified thin stillage 242 and an intermediate fine suspended solids stream 365. The intermediate fine suspended solids stream 365 is provided to the high "G" compacting centrifuge 370 which produces the fine suspended solids stream 229 which is provided to the decanter (226, FIG. 2) or to the second dryer (244, FIG. 2). In one embodiment, the fine suspended solids stream 229 has a water concentration of about 75% to about 80%, though lower water contents may be possible.

In the embodiment shown in FIG. 3, wash water 372 can be provided to the disc stack centrifuge 360 to wash dissolved solids away from the suspended solids material. In one embodiment, the wash water 372 is provided within an internal loop. In one embodiment, the wash water 372 is provided within an external washing loop.

Figure 4:
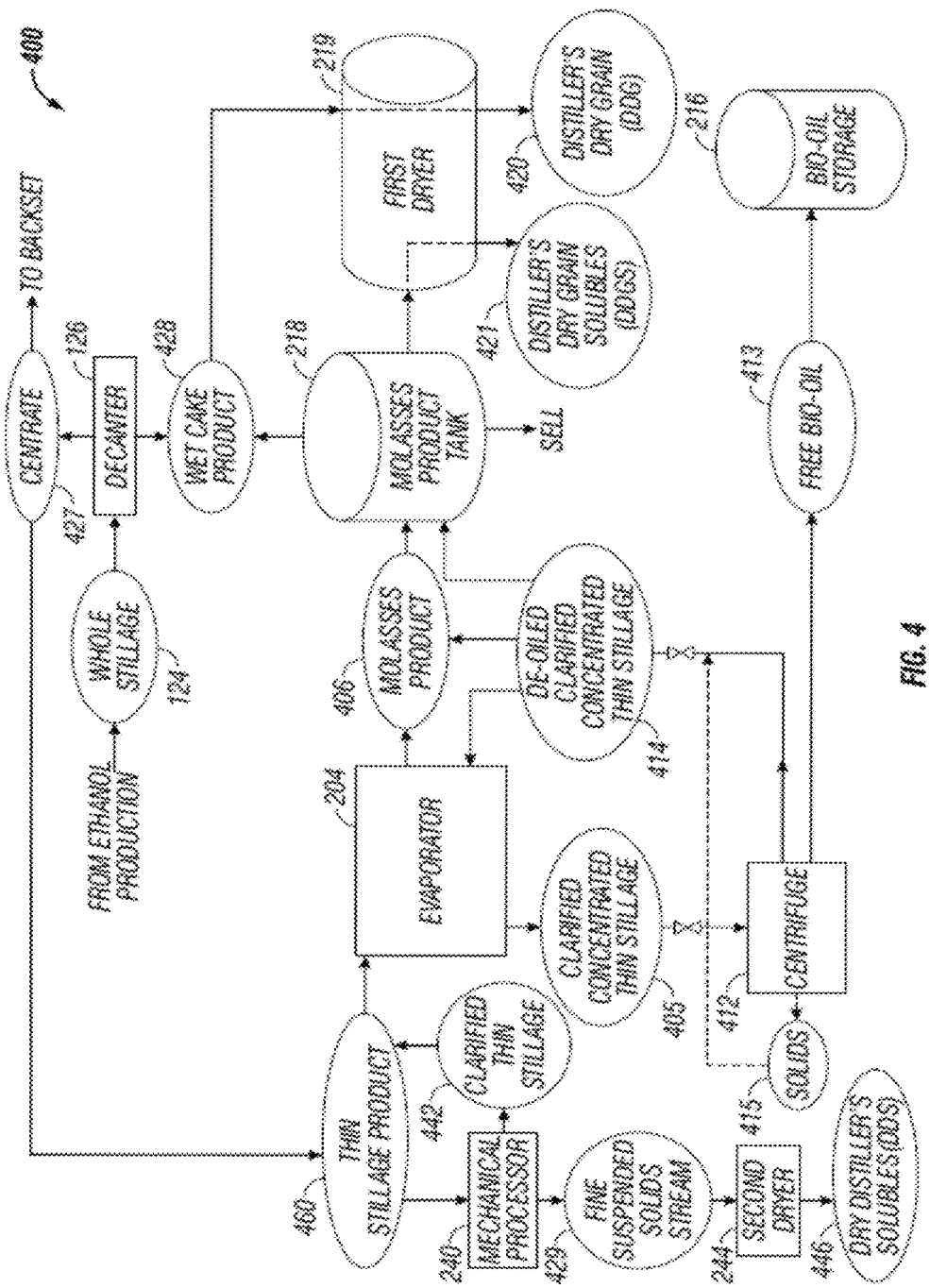
FIG. 4 is a schematic illustration of a suspended solids separation system in combination with a bio-oil recovery system according to various embodiments.

FIG. 4 shows an embodiment of a suspended solids separation system 400 in which clarified free bio-oil 413 is recovered via conventional means from clarified concentrated thin stillage 405, such as with any suitable type of centrifuge 412, i.e., without a bio-oil recovery system (250) as shown in FIG. 2. In one embodiment, the centrifuge 412 is any type of tricanter or decanter. As discussed herein, in addition to producing the clarified free bio-oil 413, the other streams exiting the centrifuge 412 include solids 415 and a de-oiled clarified concentrated thin stillage 414, which can be provided to the evaporator 204, to a molasses product 406 and/or to the molasses product tank 218.

As such, in the embodiment shown in FIG. 4, the suspended solids separating system 400 do not include a bio-oil recovery system (250) as shown in FIG. 2. Otherwise, the process can begin, in one embodiment, by separating whole stillage 124 from any suitable source, such as from ethanol production, in a decanter 126 to produce centrate 427 and a wet cake product 428. At start-up, the wet cake product comprises conventional wet cake, and thereafter, can comprise a molasses product-containing wet cake, and, in some embodiments, can additionally or alternatively include fine suspended solids from a fine suspended solids stream (e.g., 529, FIG. 5).

In the embodiment shown in FIG. 4, the wet cake product 428 is provided to a first dryer 219 to produce DDG 420. A portion of the centrate 427 is provided as "backset," a portion or all of which can be provided to the mechanical processor 240 as shown in FIG. 4. The other portion of the centrate 427, although compositionally the same, is referred to in this point of the process as thin stillage.

The thin stillage product 460 (comprised at start-up of thin stillage (not shown) and, during operation, of thin stillage in combination with clarified thin stillage 442 in varying ratios), can be provided to the mechanical processor 240. As with the above described embodiments, the thin stillage product 460 enters the mechanical processor 240 where it is separated into a fine suspended solids stream 429 and clarified thin stillage 442. In contrast to the embodiment shown in FIG. 2, however, the embodiment in FIG. 4 does not include a thin stillage product tank (203), although such a tank can be provided if desired. As such, the clarified thin stillage 442 (now depleted in protein and enriched in bio-oil and soluble as compared to the thin stillage product 460) is provided directly to the evaporator 204 for dewatering to produce clarified concentrated thin stillage 405.

The clarified concentrated thin stillage 405 is further processed in a centrifuge 412 to produce the clarified free bio-oil 413, solids 415 and de-oiled clarified concentrated thin stillage 414. The de-oiled clarified concentrated thin stillage 414 can, in turn be provided to the evaporator 204, and/or a reduced suspended solids stream, such as the molasses product 406 shown in FIG. 4 and/or a reduced suspended solids stream tank, such as the molasses product tank 218 shown in FIG. 4.

Other reduced suspended solids streams, such as the molasses product 406 shown in FIG. 4, can then be provided to the molasses product tank 218 as shown and sold and/or combined with the wet cake product 428 and provided to the first dryer 219 to produce DDGS 421. Optionally, the molasses product 406 can then be provided to the wet cake product 428 and can optionally also be provided as DWGS. Optionally, the molasses product 406 can be sold and the wet cake product 428 provided to the first dryer 219 to produce DDG 420.

Otherwise, the process proceeds as described in FIG. 2, with the fine suspended solids stream 429 being processed in any suitable manner. In the embodiment shown in FIG. 4, the fine suspended solids stream 429 is provided to a second dryer 244 to produce Distillers Dried Solubles (DDS) 446.

In the embodiment shown in FIG. 5, the suspended solids separating system 500 does not include any type of bio-oil recovery, i.e., no recovery of a bio-oil phase 236, as in FIG. 2 and no recovery of clarified free bio-oil 413 as in FIG. 4. However, as in other embodiments, whole stillage 124 can be derived from any suitable source. The system 500 shown in FIG. 5, can begin with, in one embodiment, separating whole stillage 124 in a decanter 126 to produce centrate 527 and a wet cake product 528, which, at start-up comprises conventional wet cake, and thereafter, can comprise a molasses product-containing wet cake, and, as shown in FIG. 5, can additionally or alternatively include fine suspended solids from a fine suspended solids stream 529.

In the embodiment shown in FIG. 5, the wet cake product 528 is provided to a dryer 119 to produce DDG 520. A portion of the centrate 527 is provided as "backset," a portion or all of which can be provided to the mechanical processor 240 as shown in FIG. 5. The other portion of the centrate 527, although compositionally the same, is referred to in this point of the process as thin stillage.

The thin stillage product 560 (comprised at start-up of thin stillage (not shown) and, during operation, of thin stillage in combination with clarified thin stillage 542 in varying ratios), can be provided to the mechanical processor 240 where it is separated into a fine suspended solids stream 529 and clarified thin stillage 542.

As with the embodiment shown in FIG. 4, the embodiment in FIG. 5 does not include a thin stillage product tank (203), although such a tank can be provided if desired. As such, the clarified thin stillage 542 (now depleted in protein and enriched in bio-oil and soluble as compared to the thin stillage product 560) is provided directly to the evaporator 204 for dewatering to produce a reduced suspended solids stream, such as the molasses product 506 shown in FIG. 5.

In contrast to the embodiments shown in FIGS. 2 and 4, however, in the embodiment shown in FIG. 5, the fine suspended solids stream 529 is not dried, but, as noted above, is instead provided to the decanter 126 where it can be processed and/or dried as described above. When the fine suspended solids stream 529 is provided to the decanter 126, it can be combined with the wet cake product 528 where it can be dried in a dryer 119, such as a distiller's rotary grain dryer, thus increasing the volume and protein content of the resulting DDG 520.

The various reduced suspended solids streams produced in the evaporator 204, such as the molasses product 506 shown in FIG. 5, can be provided to a molasses product tank 218 and sold and/or combined with the wet cake product 528 and provided to the dryer 119 to produce DDGS 521. Optionally, the wet cake product 528 containing varying amounts of the fine suspended solids stream 529 can additionally or alternatively also be provided as DWG.

The various embodiments described herein further produce a de-oiled water phase, which can be further concentrated to lower moisture contents (i.e., down to about 20% moisture content on a dry weight basis, while remaining a pumpable liquid. This is due to the presence of components, such as glycerol, lactic acid, and acetic acid present in liquid form and thus able to dissolve residual sugars present in the de-oiled liquid phase.

The specific materials and designs of additional minor components necessary to perform the process, e.g., valves, pumps, lines, and the like, are understood in the art and are not all described in detail herein. The apparatus and method can further be implemented using a variety of specific equipment available to and understood by those skilled in process control art. For example, means for sensing temperature, pressure and flow rates in all of the flow lines may be accomplished by any suitable means. It will also be appreciated by those skilled in the art that the various embodiments can include a system controller.

Specifically, the system controller can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. Such sensing devices may include, but are not limited to, devices for sensing temperatures, pressures, density and flow rates, and transducing the same into proportional electrical signals for transmission to read-out or control devices may be provided for in all of the principal fluid flow lines. Such a controller may be a local or remote receiver only, or a computer, such as a laptop or personal computer as is well-known in the art. In one embodiment, the controller is a personal computer having all necessary components for processing input signals and generating appropriate output signals as is understood in the art. These components can include a processor, a utility, a driver, an event queue, an application, and so forth, although the embodiments are not so limited. In one embodiment, the controller has a non-volatile memory comprised of a disk drive or read only memory device that stores a program to implement the above control and store appropriate values for comparison with the process variables as is well known in the art. In other embodiments, the information is stored remotely.

In one embodiment, these components are all computer programs executed by a processor of the computer, which operates under the control of computer instructions, typically stored in a computer-readable media such as a memory. In this way, useful operations on data and other input signals can be provided by the computer's processor. The controller also desirably includes an operating system for running the computer programs, as can be appreciated by those within the art. The system controller may also comprise a machine coupled to a control panel. Buttons and dials can be provided on the control panel to allow modification of the values and to control the agricultural biofuel energy generating system to take the desired steps described herein.

The system controller can also be programmed to ignore data from the various sensors when the operator activates certain other buttons and dials on the control panel as he deems necessary, such as fill override or emergency stop buttons. Alternatively, or in addition to the foregoing, the control panel can include indicator lights or digital displays to signal an operator as to the status of the operation. Indicator lights can also be used to signal that a certain variable level is outside the desired range, therefore alerting the operator to the need for corrective action. In such an embodiment, the corrective action is not automatic, but requires the operator to initiate corrective action by either pushing a specific button or turning a specific dial on the control panel, or by manually adjusting the appropriate valve or device.

Additionally, as is known in the art, in implementing the system described herein, general chemical engineering principles are adhered to, including accounting for the various types of energy and materials being input to and output from the system, in order to properly size the system. This includes not only the energy associated with mass flow, but also energy transferred by heat and work. In some embodiments, the system is optimized for maximum performance utilizing any known optimization methods known in the art. The present subject matter is further described by reference to the following examples, which are offered to further illustrate various embodiments. It should be understood, however, that many variations and modifications may be made while remaining within the scope of the embodiments described herein.

Example 1

Thin stillage starting material (e.g., 202, FIG. 2) was obtained from a commercial corn-to-ethanol production facility (hereinafter "ethanol production facility") and analyzed for content. The thin stillage 202 was thereafter further processed and analyzed as described below.

Thin Stillage Content

Thin stillage total % solids and thin stillage dissolved % solids were determined using a calibrated Mettler Toledo analytical balance and a Binder forced draft laboratory oven set at a temperature of approximately 105° C. The procedure involved calibrating the analytical balance and validating with standardized weights.

Determination of thin stillage total % solids and dissolved solids, included taking the fresh, hot sample and putting immediately into a hermitically sealed bottle to allow cooling of each sample for about 45 minutes to minimize moisture loss while the sample was being handled. For the dissolved % solids, samples were centrifuged at a maximum revolutions per minute (RPM) for approximately 10 minutes in a laboratory style centrifuge. Using the calibrated analytic balance, the initial weight of the aluminum weigh pan was recorded and the balance tared with the weigh pan.

For total % solids determination, approximately 10 to approximately 12 grams (g) of the cooled sample were added. For dissolved % solids determination, the sample was thereafter pipetted into a syringe with a 0.2 micrometer (μm) High Pressure Liquid Chromatography (HPLC) syringe filter. Thereafter, about 10 to about 12 grams (g) of the sample were added to the drying pan by passing the liquid through the filter, thereby removing suspended solids from the material, the total grams were recorded.

For both types of solids, the samples were heated for about 3 hours to a temperature of approximately 105° C. in a forced draft drying oven. Most samples were then placed in a desiccator to further cool under controlled conditions. However, samples, which were weighed within about 5 minutes of being removed from the oven, were not placed in the desiccator, but were instead allowed to cool for about 1 to about 2 min prior to weighing. The final dry weight of the dried sample and weigh pan were then recorded.

The various % solids were calculated as follows:

Total % Solids=((Final Weight−Initial Pan Weight)/Grams of Sample)×100%

Dissolved Solids=((Final Weight−Initial Pan Weight)/Grams of Sample)×100%

Suspended Solids=Total % Solids−Dissolved % Solids

% Suspended Ratio=% Suspended Solid/% Total Solids

% Dissolved Ratio=Dissolved Solids/% Total Solids

% Suspended to % Dissolved Ratio=% Suspended Solids/% Dissolved Solids

Compositional analysis of the thin stillage was performed using a Shimadzu HPLC system configured with SIL-20AC HT refrigerated autosampler, LC-20AT pump, CTO-20A oven, and RID-10A detector. The method used was Phenomenex Rezex ROA Organic Acid H+150×7.8 mm column with 0.6 mL/min flow rate, temperature in autosampler at about 4° C., and at about 65° C. column temperature. The results are shown in Table 1, which also includes the Degree of Polymerization (DP) for dextrin molecules.

TABLE 1

Soluble composition of thin stillage as analyzed by HPLC weight/volume %

|  | DP4+ | DP3 | Maltose | Glucose | Lactic Acid | Glycerol | Acetic Acid | Ethanol |
|---|---|---|---|---|---|---|---|---|
| average | 0.62 | 0.07 | 0.57 | 0.17 | 0.12 | 1.64 | 0.07 | 0.01 |
| stdeva | 0.19 | 0.02 | 0.21 | 0.08 | 0.04 | 0.53 | 0.03 | 0.01 |
| max | 1.18 | 0.08 | 0.73 | 0.31 | 0.15 | 2.08 | 0.1 | 0.03 |
| min | 0.27 | 0 | 0.08 | 0.04 | 0.02 | 0.32 | 0.01 | 0 |
| # samples | 53 | 53 | 53 | 53 | 53 | 53 | 53 | 53 |

DP4+ (Dextrin and 4 or more additional sugars)
DP3 (Dextrin plus 3 additional sugars)

The resulting % solids contents calculated as described above, are shown in Table 2.

TABLE 2

Compositional analysis of thin stillage

|  | pH | % TS | % Soluble | % TSS | % Fat DMB |
|---|---|---|---|---|---|
| average | 4.02 | 4.14 | 2.90 | 1.25 | 19.63 |
| stdeva | 0.15 | 0.67 | 0.33 | 0.41 | 4.35 |
| max | 4.25 | 5.69 | 4.10 | 3.00 | 26.18 |

TABLE 2-continued

Compositional analysis of thin stillage

|  | pH | % TS | % Soluble | % TSS | % Fat DMB |
|---|---|---|---|---|---|
| min | 3.64 | 3.26 | 2.15 | 0.02 | 9.53 |
| # samples | 53 | 53 | 53 | 53 | 53 |

% Total Solids (TS) = weight/weight percentage of sample which is not water
% soluble = weight/weight percentage of which is soluble in water
% Total Suspended Solids (TSS) = weight/weight percentage of sample which is not soluble in water
% Fat Dry Matter Basis (DMB) = weight percentage of a sample that is soluble in petroleum ether/weight percentage of sample which is not water Processing and Analysis of Thin Stillage Analysis of the process streams was performed according to the methods described herein and/or known to those skilled in the art using a Shimadzu HPLC system configured with SIL-20AC HT refrigerated autosampler, LC-20AT pump, CTO-20A oven, and RID-10A detector. The method used was Phenomenex Rezex ROA Organic Acid H+150× 7.8 mm column with 0.6 mL/min flow rate, temperature in autosampler 4° C., and a 65° C. column temperature.

After the initial compositional determinations were made, as described above, the thin stillage was provided to a shot style disc stack centrifuge Flottweg® model AC1000. The temperature of the thin stillage feed to the centrifuge was kept at a constant 180° F. (82° C.) during all centrifugation testing. The underflow (i.e., fine suspended solids stream, i.e., 229, FIG. 2) from the centrifuge was transferred to a holding tank where the elevated temperature was maintained. Overflow (i.e., clarified thin stillage, i.e., 242, FIG. 2) was collected for compositional analysis and dryer testing using an Anhydro spray dryer. The dried product retained color and appeared suitable for further processing. Samples of the overflow and underflow were simultaneously taken every two to four hours during the processing and individually analyzed to determine the split and efficiency of the system. The fraction of suspended solids captured by the centrifuge averaged 93.6% as shown in Table 3.

TABLE 3

Volumetric ratios of suspended solids versus total volume in spin test

|  | "shot cycle" seconds | feed suspended volume ratio | overflow suspended volume ratio | underflow suspended volume ratio | suspended solids recovery ratio |
|---|---|---|---|---|---|
| Average | 80 | 0.082 | 0.005 | 0.794 | 0.936 |
| Std dev | 0 | 0.014 | 0.003 | 0.115 | 0.044 |
| Max | 80 | 0.107 | 0.018 | 0.971 | 0.967 |
| Min | 80 | 0.036 | 0.004 | 0.286 | 0.75 |
| # samples | 48 | 40 | 40 | 40 | 40 |

(A "shot cycle" refers to the opening and closing of the gate or door against which solids build up when closed and are released when open).

Figure 6:
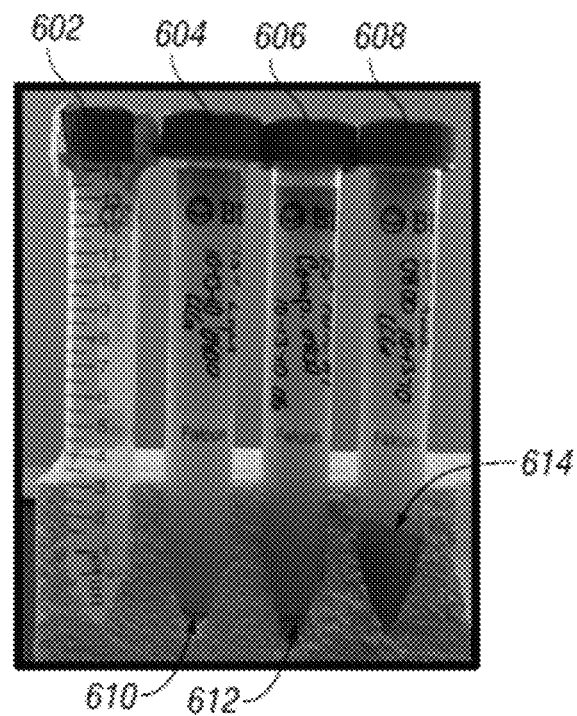
FIG. 6 is an image of test vials showing suspended solids capture efficiency for a high-speed centrifuge according to various embodiments.
Figure 7:
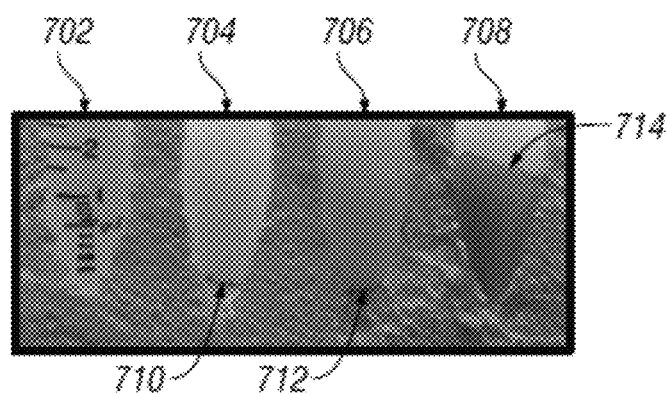
FIG. 7 is an image of spin vials showing suspended capture efficiency for a high-speed centrifuge according to various embodiments.

FIGS. 6 and 7 are images of spin vials showing suspended capture efficiency from the AC1000. FIG. 6 comprises a set of four spin vials 602, 604, 606 and 608. Spin vial 602 is empty but is included to show the volume delineations. Black lines drawn on spin vials 604, 606 and 608 are labeled as 610, 612 and 614, respectively. These markings denote an intersection line between the suspended solids and supernatant layers. Spin vial 608 is a sample containing the feed material with approximately 1.5 mL solids in a 14 mL sample. Spin vials 604 and 606 are overflow samples produced from the starting material in spin vial 608 according to the process described above with the high speed centrifuge. As FIG. 6 shows, spin vials 604 and 606 each have approximately 0.08 mL of solids in a 14 mL sample. This represents 94.7% suspended solids capture efficiency.

The feed rate was adjusted during the operation starting at about 2 gallons per minute and ramping to about 4 gallons per minute over a 4 day test period. A second 5 day test period used an approximately 4.4 gallon per minute feed rate was conducted at a later time. Compositional analysis of the overflow and underflow obtained in the manner described above during the 9 days of operation is shown in Tables 4 and 5. Table 4.

TABLE 4

Compositional analysis of 53 overflow samples taken over the 9 days of centrifuge operation
Centrifuge Overflow

|  | % TS | % Soluble | % TSS | % Fat DMB |
|---|---|---|---|---|
| Avg | 3.5 | 3.45 | 0.30 | 20.28 |
| Stdeva | 0.44 | 0.49 | 1.80 | 6.05 |
| Max | 5.80 | 5.80 | 12.85 | 38.51 |
| Min | 2.93 | 2.74 | −0.57 | 7.4 |
| # samples | 53 | 51 | 53 | 53 |

TABLE 5

Compositional analysis of 53 underflow samples taken over 9 days of centrifuge operation
Centrifuge Underflow

|  | % TS | % Soluble | % TSS | % Fat DMB | % Prot DMB |
|---|---|---|---|---|---|
| Avg | 13.86 | 1.33 | 12.64 | 7.55 | 40.57 |
| Stdeva | 2.31 | 0.71 | 2.64 | 2.97 | 3.34 |
| Max | 20.21 | 4.28 | 21.08 | 15.27 | 49.01 |
| Min | 8.39 | 0.22 | 6.46 | 2.47 | 31.19 |
| # samples | 53 | 46 | 53 | 53 | 53 |

% Prot DMB = (weight percentage of Nitrogen of a sample × 6.25)/weight percent of a sample which is not water A mass balance split between the two fractions was calculated by using the ratios of suspended-to-dissolved solids in feed and comparing to the overflow and underflow. This analysis showed that about 70% of the non-water mass splits into the overflow and about 30% splits into the underflow. Multiplying this mass split times the fraction of bio-oil in each material (20.3% concentration fat in overflow and 7.6% concentration fat in underflow), it was determined that approximately 86% of the bio-oil in the thin stillage product was captured in the overflow and 14% of the bio-oil was captured in the underflow.

Overflow from the centrifuge separation was concentrated under vacuum at approximately 200° F. (93° C.) from an initial Brix concentration of 5.3 to a final Brix concentration of 39.1 degrees Brix (hereinafter "Brix"). ("Degrees Brix" refers to sugar content of an aqueous solution. One degree Brix corresponds to 1 gram of sucrose in 100 grams of solution, thus representing the strength of the solution as a percentage by weight (% w/w)). Concentrated material was drawn out of the evaporator as the Brix approached 35 in order to build a stock of 35 Brix to test for bio-oil extraction via centrifugation. Brix measurements were made with a handheld Brix refractometer during the concentration process. As Brix measurements were made, the samples were also tested for bio-oil via laboratory spin testing. There was a fair amount of emulsion in the bio-oil layer. As the total solids concentration increased, the bio-oil/emulsion concentration increased, as observed by the spin testing (which determined solids by volume).

Figure 8:
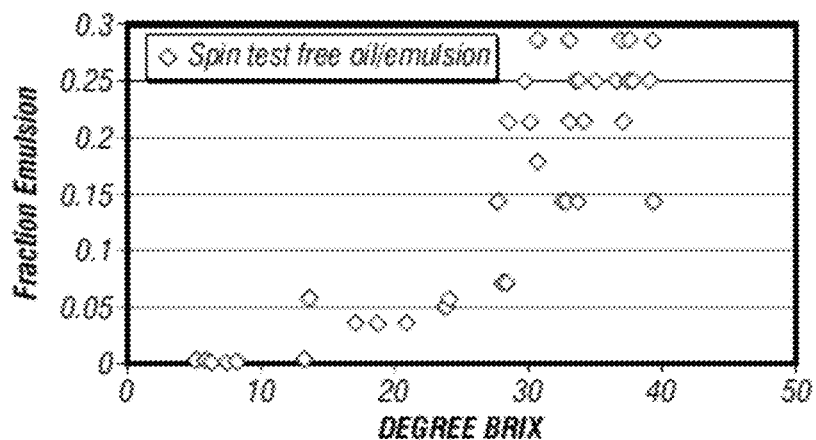
FIG. 8 is a graph showing fraction emulsion versus degree Brix (i.e., sugar content) concentration in clarified concentrated thin stillage according to various embodiments.

See, for example FIG. 8 which shows a volume/volume emulsion/bio-oil with increasing Brix concentration. As can be seen, the samples exhibited increasing bio-oil emulsion as the amount of solids increased.

The 35 Brix concentrate was centrifuged with a Flottweg™ Z23 tricanter for bio-oil recovery. The feed was delivered hot to the tricanter and an emulsified bio-oil layer was recovered from the centrifuge. This emulsified bio-oil was broken into free bio-oil and water phases by adding ethanol at elevated temperature to the emulsion and then flashing the ethanol back out of the emulsified mixture. (See patent '627). Using this technique, it was observed that recoveries over 80% of theoretical are achievable.

Example 2

In this testing, the thin stillage from the same commercial source as described in Example 1 was subjected to further processing and compositional data on underflow (i.e., fine suspended solids stream, i.e., 229, FIG. 2) and overflow (i.e., clarified thin stillage, i.e., 242, FIG. 2) was obtained.

A 600 gallon tank and tube-and-shell heat exchanger (constructed in-house) were used as an evaporator in the pilot plant. A Flottweg AC1000 (disc stack) was used to remove suspended solids from the thin stillage. The AC 1000 was operated at a rate of about 2 to 4 gpm. The evaporative rate on the evaporator was about 1.1 gpm. A Flottweg Z23 (tricanter) was also used to separate the emulsion concentrate. A modified commercial spray dryer was used to spray dry the centrifuged solids.

Suspended solids recovery was about 95%, while DDS recovery was between about 55 up to 80 v/v % concentration. Protein levels in the DDS were measured at about 40%, with bio-oil content about 5%.

Table 6 shows compositional data from this testing determined according to the methods described in Example 1 and other methods known to those skilled in the art:

TABLE 6

Compositional Data (% of dry matter)

| | Centrifuge Feed | | | Overflow | | Underflow | | |
|---|---|---|---|---|---|---|---|---|
| | pH | Fat | Total solids | Fat | Total solids | Protein | Fat | Total solids |
| avg | 4.0 | 20 | 4.3 | 21. | 3.7 | 42 | 5.3 | 14 |
| std | 0.36 | 2.5 | 0.37 | 3.1 | 0.50 | 3.1 | 1.9 | 1.9 |
| max | 4.3 | 24. | 5.7 | 27 | 5.8 | 49 | 9.4 | 18 |
| min | 3.6 | 14 | 3.8 | 16 | 3.1 | 34 | 2.5 | 12 |

The fine suspended solids stream (i.e., 229 in FIG. 2) had the composition as shown in Table 7:

TABLE 7

Fine Suspended Solids Stream Analysis (% of dry matter unless noted otherwise)

| | Dry Basis | As Received | |
|---|---|---|---|
| Moisture | | 5.15 | % |
| Dry Matter | | 94.85 | % |
| Protein, Crude | 29.39 | 27.88 | % |
| Acid Detergent Insoluble Protein | 0.62 | 0.59 | % |
| Neutral Detergent Insoluble Protein | 2.12 | 2.01 | % |
| Soluble Protein (% of Crude Protein) | | 18 | % |
| ADF—Acid Detergent Fiber | 1.35 | 1.28 | % |

TABLE 7-continued

Fine Suspended Solids Stream Analysis (% of dry matter unless noted otherwise)

| | Dry Basis | As Received | |
|---|---|---|---|
| NDF—Neutral Detergent Fiber | 5.13 | 4.87 | % |
| NFC—Non Fibrous Carbohydrates | 38.46 | | % |
| Lignin-Acid Insoluble | Less than 0.2 | | % |
| NEL: Net Energy-Lactation | 1.33 | 1.26 | Mcal/lb |
| NEG: Net Energy-Gain | 1.06 | 1.01 | Mcal/lb |
| NEM: Net Energy-Maintenance | 1.46 | 1.38 | Mcal/lb |
| TDN: Total Digestible Nutrients | 124.90 | 118.47 | % |
| Digestible Energy—DE | 2.50 | 2.37 | Mcal/lb |
| Metabolizable Energy—ME | 2.05 | 1.95 | Mcal/lb |
| Fat (EE) | 23.96 | 22.73 | % |
| Ash | 5.18 | 4.91 | % |
| Calcium | 0.14 | 0.13 | % |
| Phosphorus | 0.89 | 0.84 | % |
| Potassium | 1.11 | 1.05 | % |
| Magnesium | 0.34 | 0.32 | % |
| Sodium | 0.49 | 0.46 | % |
| Chloride | 0.08 | 0.08 | % |
| Sulfur | 1.28 | 1.21 | % |
| Cobalt | Less than 0.2 | | ppm |
| Copper | 17.30 | 16.41 | ppm |
| Iron | 258.00 | 244.71 | ppm |
| Manganese | 46.20 | 43.82 | ppm |
| Molybdenum | Less than 0.3 | | ppm |
| Zinc | 53.70 | 50.93 | ppm |
| Total Starch | 12.3 | 11.7 | % |
| RFV—Relative Feed Value | 1593 | | s.u. |

The molasses product (e.g., 206) had a composition in a first test as shown in Table 8:

TABLE 8

Molasses Product Analysis (Run 1) (% of dry matter unless noted otherwise)

| | Dry Basis | As Received | |
|---|---|---|---|
| Moisture, Karl-Fischer | | 36.2 | % |
| Dry Matter | | 63.8 | % |
| Protein, Crude | 14.091 | 8.99 | % |
| Acid Detergent Insoluble Protein | | 0 | % |
| Neutral Detergent Insoluble Protein | | 0 | % |
| Soluble Protein (% of Crude Protein) | | 98 | % |
| ADF—Acid Detergent Fiber | 1.254 | 0.8 | % |
| NDF—Neutral Detergent Fiber | 1.881 | 1.2 | % |
| NFC—Non Fibrous Carbohydrates | 60.94 | 38.88 | % |
| Lignin-Acid Insoluble | | 0 | |
| NEL: Net Energy-Lactation | 0.91 | 0.581 | Mcal/lb |
| NEG: Net Energy-Gain | 0.67 | 0.427 | Mcal/lb |
| NEM: Net Energy-Maintenance | 0.98 | 0.625 | Mcal/lb |
| TDN: Total Digestible Nutrients | 87.13 | 55.589 | % |
| Digestible Energy—DE | 1.746 | 1.114 | Mcal/lb |
| Metabolizable Energy—ME | 1.432 | 0.914 | Mcal/lb |
| Fat By Acid-Hydrolysis | 7.853 | 5.01 | % |
| Ash | 15.251 | 9.73 | % |
| Calcium | 0.094 | 0.06 | % |
| Phosphorus | 2.006 | 1.28 | % |
| Potassium | 2.9 | 1.85 | % |
| Magnesium | 0.956 | 0.61 | % |
| Sodium | 1.254 | 0.8 | % |
| Chloride | 0.627 | 0.4 | % |
| Sulfur | 2.006 | 1.28 | % |
| Cobalt | | 0 | ppm |
| Copper | 4.561 | 2.91 | ppm |
| Iron | 133.072 | 84.9 | ppm |
| Manganese | 102.351 | 65.3 | ppm |
| Molybdenum | | 0 | ppm |
| Zinc | 115.831 | 73.9 | ppm |
| Total Starch | 5.799 | 3.7 | % |

The HPLC profile (% w/v) for the molasses product of Table 8 is shown in Table 9.

TABLE 9

DMB - HPLC profile (% W/V)

| Molasses Product | DP4+ | DP3 | Malt-ose | Glu-cose | Lac-tic | Glyc-erol | Ace-tic | Eth-anol |
|---|---|---|---|---|---|---|---|---|
| 1 | 12.64 | 1.71 | 8.09 | 3.33 | 2.66 | 36.52 | 0.27 | 0.00 |

The molasses product (e.g., 206) had a composition in a second test as shown in Table 10:

TABLE 10

Molasses Product Analysis (Run 2) (% of dry matter unless noted otherwise)

| | Dry Basis | As Received | |
|---|---|---|---|
| Moisture, Karl-Fischer | | 17.3 | % |
| Dry Matter | | 82.7 | % |
| Protein, Crude | 8.767 | 7.25 | % |
| Acid Detergent Insoluble Protein | | 0 | % |
| Neutral Detergent Insoluble Protein | | 0 | % |
| Soluble Protein (% of Crude Protein) | | 100 | % |
| ADF—Acid Detergent Fiber | 0.931 | 0.77 | % |
| NDF—Neutral Detergent Fiber | 1.282 | 1.06 | % |
| NFC—Non Fibrous Carbohydrates | 67.13 | 55.517 | % |
| Lignin-Acid Insoluble | | 0 | % |
| Fat By Acid-Hydrolysis | 12.201 | 10.09 | % |
| Ash | 10.629 | 8.79 | % |
| Calcium | 0.085 | 0.07 | % |
| Phosphorus | 1.79 | 1.48 | % |
| Potassium | 2.963 | 2.45 | % |
| Magnesium | 0.762 | 0.63 | % |
| Sodium | 0.568 | 0.47 | % |
| Chloride | 1.112 | 0.92 | % |
| Sulfur | 0.653 | 0.54 | % |
| Cobalt | | 0 | ppm |
| Copper | 3.458 | 2.86 | ppm |
| Iron | 73.156 | 60.5 | ppm |
| Manganese | 23.216 | 19.2 | ppm |
| Molybdenum | | 0 | ppm |
| Zinc | 73.156 | 60.5 | ppm |
| Total Starch | 2.539 | 2.1 | % |

The HPLC profile (% w/v) for the molasses product of Table 10 is shown in Table 11.

TABLE 11

DMB - HPLC profile (% W/V)

| Syrup | DP4+ | DP3 | Malt-ose | Glu-cose | Lac-tic | Glyc-erol | Ace-tic | Eth-anol |
|---|---|---|---|---|---|---|---|---|
| 2 | 10.84 | 1.38 | 6.57 | 6.62 | 2.74 | 36.02 | 0.26 | 0.00 |

Figure 9:
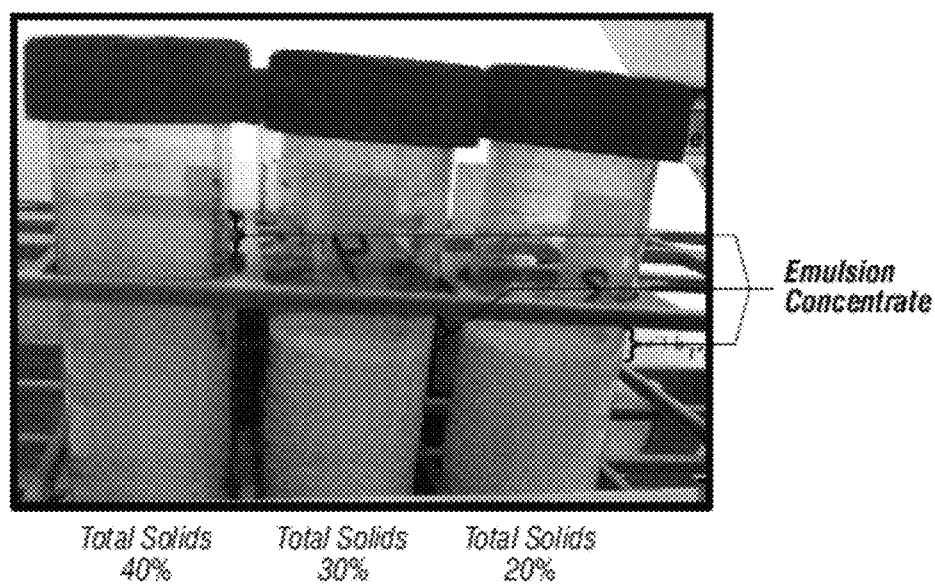
FIG. 9 is an image of spin vials containing a molasses product according to various embodiments.

See also FIG. 9 showing spin vials containing the molasses product obtained in this testing at 30%, 40% and 50% total solids, which contains varying amounts of emulsion concentrate.

It was observed that overflow held for more than 14 days allowed Maillard products to form, which likely resulted in a lower quality molasses product. Possible solutions to this issue are discussed in Example 4 (Prophetic).

Additionally, the Regenerative Thermal Oxidizer (RTO) did not function properly during the evaporation run, causing loss of the vacuum source. As a result, the temperature of the molasses product in the evaporator increased from 170° F. to 215° F., thus overcooking the molasses product, causing an off-odor in the molasses product and producing additional Maillard reaction products. Possible solutions to this issue are discussed in Example 5 (Prophetic).

Example 3

Centrate (e.g., 227, FIG. 2) from a decanter (e.g., 126, FIG. 2) was taken from the same. Commercial ethanol production facility described in Example 1 during real-time operations.

An FQ950 (Fluid Quip) stack nozzle centrifuge (size 40 nozzle) was used to recover suspended solids (comprising primarily fine suspended solids as defined herein) from the centrate. Samples were drawn off directly from the centrate into the centrifuge at a temperature of approximately 180° F. (82° C.).

The centrifuge was flushed twice per day during testing. In-place cleaning was performed every 7 days using 5% caustic soda concentration.

The centrifuge was operated at a full-rated rotation rate. Feed rate to the centrifuge is shown below in Table 12. Overflow from the centrifuge was transferred back into the evaporation system in the facility. Underflow from the centrifuge was transferred to the decanter system in the facility. The fraction of suspended solids captured by the centrifuge averaged 86.3% as shown in Table 13.

Overflow and underflow rates are also shown in Table 12. The centrifuge tended to entrain air into the overflow and underflow process streams, which likely introduced a minor error (less than 15%) in the flow rate meter readings for these streams. As such, the values given in Table 12 are approximate

TABLE 12

Volumetric ratios of suspended solids versus total volume in-spin test

| | feed rate (Lpm) | overflow (Lpm) | underflow (Lpm) | feed suspended volume ratio | overflow suspended volume ratio | underflow suspended volume ratio | suspended solids recovery ratio |
|---|---|---|---|---|---|---|---|
| Average | 1500 | 1150 | 425 | 0.13 | 0.02 | 0.3 | 0.9 |
| st. dev. | 120 | 200 | 140 | 0.02 | 0.01 | 0.05 | 0.1 |
| Max | 1800 | 1830 | 540 | 0.2 | 0.07 | 0.47 | 1 |
| Min | 1025 | 800 | 0 | 0.07 | 0 | 0.17 | 0.4 |
| # samples | 165 | 165 | 165 | 165 | 165 | 165 | 165 |

Example 4 (Prophetic)

Improved results as compared to those discussed in Example 2 may be obtained by matching evaporator performance rate with overflow production rate. In this way, overflow material at 190° F. (88° C.) is kept for a number of hours versus weeks before going to the evaporator.

Improved results may additionally or alternatively be obtained by using an additional heat exchanger may be used to increase heat input into the evaporator to increase the throughput of the system. The new heat exchanger may be put in parallel with the existing heat exchanger to increase the evaporative rate by approximately 2.5 times. This is expected to create a 2.5 gpm (9.5 Lpm) condensate production rate.

Improved results may additionally or alternatively be obtained by using an additional vacuum line to reduce pressure in the evaporator, thus keeping the temperature down and/or increasing the flux rate through the exchanger.

These processing steps may be tested alone or in combination, with improved results possible, as compared to the results in Example 2.

Example 5

Prophetic

Improved results as compared to those discussed in Example 2 may be obtained by monitoring evaporator temperatures.

Improved results may additionally or alternatively be obtained by selecting 35 Brix as a target concentration for the molasses product prior to bio-oil recovery. Products above this concentration can be de-oiled with Z23.

Improved results may additionally or alternatively be obtained by selecting 70-75 Brix as a target concentration for the final molasses product concentration based on flowability. This concentration can be accomplished through evaporation.

These processing steps may be tested alone or in combination, with improved results possible, as compared to the results in Example 2.

Example 6

Prophetic

DDS material has a high variability in fat content, likely due to the shot cycle frequency being used on the unit combined with feed rate. The working hypothesis is that after centrifugation, the DDS material has a full open shot cycle, with the next cycle having very low bio-oil content because the system is getting maximum recovery. Each successive shot cycle will produce a higher bio-oil content because the system is getting maximum recovery. Each successive shot cycle will produce a higher bio-oil content DDS recovery. It is desired to have low bio-oil content in the DDS material, as well as a consistent product so the bio-oil concentration will be determined with an increased degree of accuracy.

The shot cycle hypothesis will be tested by taking a series of samples throughout the full cycle to determine the compositional make-up of the bio-oil. Depending on the results, the shot cycle will be altered in order to produce DDS material that contains no more than 5% fat.

In one embodiment, a method is provided, comprising clarifying a thin stillage product in a mechanical processor (e.g., centrifuge and/or one or more filters, and the like) to produce a fine suspended solids stream and clarified thin stillage; and providing the thin stillage product and the clarified thin stillage, separately or in a combined stream, to one or more evaporators to produce one or more reduced suspended solids streams, each stream having a reduced amount of suspended solids and a lower viscosity as compared to process streams having a comparable total solids content and which contains a higher amount of suspended solids. The suspended solids can comprise, in one embodiment, less than about 10% by weight of the total solids content and the total solids content can be between about 68% and about 72% by weight. In one embodiment, substantially all or a majority of the clarified thin stillage can be provided to the thin stillage product.

In one embodiment, at least one of the one or more reduced suspended solids stream has a total solids content comprising suspended solids and dissolved solids in an amount between about 30% and about 90% by weight, wherein the suspended solids comprise less than 25% by weight of the total solids content.

At least one of the one or more reduced suspended solids stream can be, for example, clarified concentrated thin stillage, which contains an amount of bio-oil that is greater, by volume, than an amount of bio-oil present in a concentrated thin stillage that has not been clarified. In some embodiments, the clarified concentrated thin stillage can be subject to mechanical processing to produce a bio-oil product, such as a bio-oil phase or free bio-oil.

In one embodiment, the mechanical processing produces an emulsion concentrate that is broken in an emulsion breaking reaction to produce the bio-oil phase. In one embodiment, the mechanical processing also produces a solids stream and a de-oiled clarified concentrated thin stillage product, and the method further comprises providing the de-oiled clarified concentrated thin stillage product to the one or more evaporators.

In one embodiment, at least one of the one or more reduced suspended solids stream is a molasses product having a total solids content no less than about 45% by weight, wherein the suspended solids comprise less than 25% by weight down to about 0% of the total solids content.

The method can further comprise, for example, combining at least a portion of the one or more reduced suspended solids streams with wet cake to produce a wet cake product containing reduced suspended solids, and drying the wet cake product to produce a distillers dried grain.

In one embodiment, the method further comprises providing at least a portion of the one or more reduced suspended solids streams to a dryer to produce distiller's dried grain solubles and/or drying the fine suspended solids stream to produce distillers dried solubles containing single cell proteins.

In one embodiment, the thin stillage product may be produced from low water extractable non-starch polysaccharide (NSP)-containing plant biomass. Use of NSP-containing biomass provides reduced protein dilution in the resulting process stream. As such, an improved feed product from the underflow (e.g., fine suspended solids stream, e.g., 229, FIG. 2) may be provided.

Various bio-products can be produced according to the methods described herein, including, but not limited to, clarified concentrated thin stillage, clarified thin stillage, fine suspended solids stream, a molasses product, distillers dried solubles, wet cake product, distiller's dry grain, distiller's dry grain solubles, and combinations thereof.

In one embodiment, a method is provided comprising clarifying a thin stillage product in a mechanical processor to produce a fine suspended solids stream and clarified thin stillage; providing the thin stillage product and the clarified thin stillage, separately or in a combined stream, to one or more evaporators to produce at least two reduced suspended solids streams, each of the at least two streams having a reduced amount of suspended solids and a lower viscosity as compared to process streams having a comparable total solids content but containing a higher amount of suspended solids; and subjecting at least one of the at least two reduced suspended solids streams to mechanical processing to produce a bio-oil product. The at least two reduced suspended solids streams may comprise, for example, a stream containing clarified concentrated thin stillage and a stream containing a molasses product, wherein the clarified concentrated thin stillage is subjected to the mechanical processing. The molasses product may contain, for example, two to three times the amount of bio-oil per volume as compared to concentrated thin stillage. In one embodiment, the molasses product has between about 65% and 75% total solids, by weight, and contains between about 8% and about 12% bio-oil, by volume. The molasses product may be sold, combined with wet cake, and/or dried.

In one embodiment, a method is provided, comprising clarifying a thin stillage product to produce one or more reduced suspended solids streams, each having a total solids content between about 30% and about 90% by weight, wherein the total solids content comprises suspended solids and dissolved solids, and the suspended solids comprise less than 25% by weight of the total solids content.

In one embodiment, a system is provided, comprising a clarifier for clarifying a thin stillage product to produce a fine suspended solids stream and clarified thin stillage; and one or more evaporators for evaporating the thin stillage product and the clarified thin stillage to produce one or more reduced suspended solids streams, each having a reduced amount of suspended solids and a lower viscosity as compared to a process stream having a comparable total solids content but containing a higher amount of suspended solids. A system control device (e.g., a holding tank that is optionally connected to a heat source) that is adapted to provide a quantity of thin stillage product for use downstream may also be used.

In one embodiment, the system further comprises a biomass processing facility having one or more process streams and configured to produce a biofuel and a bio-oil-containing process stream, wherein the biomass processing facility includes a dewatering system for dewatering the bio-oil containing process stream to produce an emulsion concentrate containing entrapped bio-oil; and an emulsion breaking system configured to at least partially break the emulsion concentrate with an emulsion breaking additive so that the entrapped bio-oil (e.g., corn oil) is released. The system can further comprise, for example, a bio-product production facility capable of producing bio-products, such as biofuels, biochemical, and the like. In one embodiment, the biofuel is alcohol (e.g., ethanol, butanol, etc.).

In one embodiment, a method for reducing a dryer load in a bio-product production facility is provided comprising clarifying a thin stillage product in a mechanical processor to produce a fine suspended solids stream and clarified thin stillage; and providing the thin stillage product and the clarified thin stillage, separately or in a combined stream, to one or more evaporators to produce one or more reduced suspended solids streams, each stream having a reduced amount of suspended solids and a lower viscosity as compared to process streams having a comparable total solids content and which contains a higher amount of suspended solids, wherein the dryer load is reduced as compared to a method performed without a clarifying step.

In one embodiment, a method for improving bio-product production yield is provided comprising clarifying a thin stillage product in a mechanical processor to produce a fine suspended solids stream and clarified thin stillage; and providing the thin stillage product and the clarified thin stillage, separately or in a combined stream, to one or more evaporators to produce one or more reduced suspended solids streams, each stream having a reduced amount of suspended solids and a lower viscosity as compared to process streams having a comparable total solids content and which contains a higher amount of suspended solids, wherein bio-products production yield is increase as compared to a method performed without a clarifying step.

In one embodiment, a method of reducing emissions in a bio-product production facility comprising clarifying a thin stillage product in a mechanical processor to produce a fine suspended solids stream and clarified thin stillage; and providing the thin stillage product and the clarified thin stillage, separately or in a combined stream, to one or more evaporators to produce one or more reduced suspended solids streams, each stream having a reduced amount of suspended solids and a lower viscosity as compared to process streams having a comparable total solids content and which contains a higher amount of suspended solids, wherein emissions from the bio-product production facility are reduced as compared to a method performed without a clarifying step.

In one embodiment, energy costs in the alcohol production facility are reduced as compared with conventional methods, since more moisture can be removed with evaporators rather than expensive dryers. In one embodiment, the reduced dryer load allows for an increased rate of production of alcohol and co-products at the alcohol production facility. In one embodiment, dryer load is reduced by at least 10%.

In one embodiment, production rate is also improved by operating one or more evaporators (e.g., first effect evaporators) at a higher temperature, thus reducing the energy required for evaporation. In one embodiment, the energy requirements for evaporation are reduced by at least 33%.

DDGS produced according to the embodiments described herein not only meets current minimum market levels of 8% bio-oil content by volume, but in some embodiments contain an increased amount of protein, as well as a reduced sulfur and ash content.

The various embodiments also reduce production facility emissions overall, including emission of volatile organic contaminants (VOCs) since dryer loads are reduced.

Although specific embodiments have been illustrated and described herein, it will be appreciated by those of ordinary skill in the art that any procedure that is calculated to achieve the same purpose may be substituted for the specific embodiments shown. This application is intended to cover any adaptations or variations of the present subject matter. Therefore, it is manifestly intended that embodiments of this invention be limited only by the claims and the equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A stillage product comprising fine suspended solids stream comprising:
   a protein content of greater than 29% by weight on a dry-matter basis;
   an acid detergent fiber content of less than 2% by weight on a dry-matter basis; and
   a neutral detergent insoluble protein of less than 2.5% by weight on a dry-matter basis.

2. The stillage product fine suspended solids stream of claim 1, further comprising a net energy for maintenance of about 1.5 Mcal/lb on a dry-matter basis.

3. The stillage product fine suspended solids stream of claim 1, further comprising a net energy for gain of about 1 Mcal/lb on a dry-matter basis.

4. The stillage product fine suspended solids stream of claim 1, further comprising a net energy for lactation of about 1.3 Mcal/lb on a dry-matter basis.

5. The stillage product fine suspended solids stream of claim 1, further comprising an acid detergent fiber content of about 1.35% by weight on a dry-matter basis.

6. The stillage product fine suspended solids stream of claim 1, further comprising a neutral detergent fiber content of about 5% by weight on a dry-matter basis.

7. The stillage product fine suspended solids stream of claim 1, wherein the fat content comprises of about 24% by weight on a dry-matter basis.

8. The stillage product fine suspended solids stream of claim 1, further comprising non-fibrous carbohydrates content of less than 40% by weight on a dry-matter basis.

9. The stillage product fine suspended solids stream of claim 1, further comprising yeast content of less than 40% by weight.

10. The stillage product fine suspended solids stream of claim 1, wherein the fat content comprises of about 20% by weight on a dry-matter basis.

11. A stillage product comprising fine suspended solids stream comprising:
    a total digestible nutrients of about 125%;
    a protein content of greater than 29% by weight on a dry-matter basis;
    an acid detergent fiber content of less than 2% by weight on a dry-matter basis; and
    a neutral detergent insoluble protein of less than 2.5% by weight on a dry-matter basis.

* * * * *